United States Patent
Sun et al.

(10) Patent No.: US 9,571,856 B2
(45) Date of Patent: Feb. 14, 2017

(54) CONVERSION OPERATIONS IN SCALABLE VIDEO ENCODING AND DECODING

(75) Inventors: Shijun Sun, Redmond, WA (US); Shankar Regunathan, Bellevue, WA (US); Chengjie Tu, Sammamish, WA (US); Chih-Lung Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 831 days.

(21) Appl. No.: 12/197,922

(22) Filed: Aug. 25, 2008

(65) Prior Publication Data

US 2010/0046612 A1    Feb. 25, 2010

(51) Int. Cl.
*H04N 7/12*    (2006.01)
*H04N 19/59*    (2014.01)
(Continued)

(52) U.S. Cl.
CPC ............ *H04N 19/59* (2014.11); *H04N 19/117* (2014.11); *H04N 19/149* (2014.11);
(Continued)

(58) Field of Classification Search
CPC .................. H04N 19/00436; H04N 19/00781; H04N 19/00321; H04N 19/00757; H04N 5/2355; H04N 19/00018; H04N 19/00066; H04N 19/00127; H04N 19/00175; H04N 19/00181; H04N 19/00218; H04N 19/00224
(Continued)

(56) References Cited

U.S. PATENT DOCUMENTS

| 4,334,244 A | 6/1982 | Chan et al. |
| 4,460,924 A | 7/1984 | Lippel |

(Continued)

FOREIGN PATENT DOCUMENTS

| CN | 1378384 | 11/2002 |
| CN | 1465193 | 12/2003 |

(Continued)

OTHER PUBLICATIONS

Yuwen, Wu "Bit-depth scalablity compatible to H.264/AVC-scalable extension", Jun. 19, 2008, Elsevier J.Vis. Commun. Image R 19 (2008) 372-381.*

(Continued)

*Primary Examiner* — Jessica M Prince
(74) *Attorney, Agent, or Firm* — Sunah Lee; Dan Choi; Micky Minhas

(57) ABSTRACT

Techniques and tools for conversion operations between modules in a scalable video encoding tool or scalable video decoding tool are described. For example, given reconstructed base layer video in a low resolution format (e.g., 4:2:0 video with 8 bits per sample) an encoding tool and decoding tool adaptively filter the reconstructed base layer video and upsample its sample values to a higher sample depth (e.g., 10 bits per sample). The tools also adaptively scale chroma samples to a higher chroma sampling rate (e.g., 4:2:2). The adaptive filtering and chroma scaling help reduce energy in inter-layer residual video by making the reconstructed base layer video closer to input video, which typically makes compression of the inter-layer residual video more efficient. The encoding tool also remaps sample values of the inter-layer residual video to adjust dynamic range before encoding, and the decoding tool performs inverse remapping after decoding.

20 Claims, 9 Drawing Sheets

(51) Int. Cl.
*H04N 19/149* (2014.01)
*H04N 19/117* (2014.01)
*H04N 19/186* (2014.01)
*H04N 19/187* (2014.01)
*H04N 19/33* (2014.01)
*H04N 19/86* (2014.01)
*H04N 19/40* (2014.01)

(52) U.S. Cl.
CPC ......... *H04N 19/186* (2014.11); *H04N 19/187* (2014.11); *H04N 19/33* (2014.11); *H04N 19/40* (2014.11); *H04N 19/86* (2014.11)

(58) Field of Classification Search
USPC ...................................... 375/240.02; 382/261
See application file for complete search history.

(56) References Cited

U.S. PATENT DOCUMENTS

| | | |
|---|---|---|
| 4,849,812 A | 7/1989 | Borgers et al. |
| 5,089,889 A | 2/1992 | Sugiyama |
| 5,136,377 A | 8/1992 | Johnston et al. |
| 5,289,283 A | 2/1994 | Hopper et al. |
| 5,300,949 A | 4/1994 | Rodriquez et al. |
| 5,414,469 A | 5/1995 | Gonzales et al. |
| 5,467,134 A | 11/1995 | Laney et al. |
| 5,509,089 A | 4/1996 | Ghoshal |
| 5,544,286 A | 8/1996 | Laney |
| 5,565,920 A | 10/1996 | Lee et al. |
| 5,585,861 A | 12/1996 | Taniguchi et al. |
| 5,604,856 A | 2/1997 | Guenter et al. |
| 5,611,038 A | 3/1997 | Shaw et al. |
| 5,625,714 A | 4/1997 | Fukuda |
| 5,646,691 A | 7/1997 | Yokoyama |
| 5,764,296 A | 6/1998 | Shin |
| 5,787,203 A | 7/1998 | Lee et al. |
| 5,799,113 A | 8/1998 | Lee |
| RE35,910 E | 9/1998 | Nagata et al. |
| 5,821,986 A | 10/1998 | Yuan et al. |
| 5,828,421 A | 10/1998 | Boyce et al. |
| 5,835,149 A | 11/1998 | Astle |
| 5,835,495 A | 11/1998 | Ferriere |
| 5,864,637 A | 1/1999 | Liu et al. |
| 5,905,504 A | 5/1999 | Barkans et al. |
| 5,923,784 A | 7/1999 | Rao et al. |
| 5,926,209 A | 7/1999 | Glatt |
| 5,946,419 A | 8/1999 | Chen et al. |
| 5,959,693 A | 9/1999 | Wu et al. |
| 5,969,764 A | 10/1999 | Sun et al. |
| 5,970,173 A | 10/1999 | Lee et al. |
| 5,995,150 A | 11/1999 | Hsieh et al. |
| 6,002,801 A | 12/1999 | Strongin et al. |
| 6,026,190 A | 2/2000 | Astle |
| 6,094,231 A | 7/2000 | Wischer-Mann |
| 6,104,434 A | 8/2000 | Nakagawa et al. |
| 6,115,420 A | 9/2000 | Wang |
| 6,115,689 A | 9/2000 | Malvar |
| 6,125,147 A | 9/2000 | Florencio et al. |
| 6,134,265 A | 10/2000 | Long |
| 6,157,396 A | 12/2000 | Margulis et al. |
| 6,182,034 B1 | 1/2001 | Malvar |
| 6,219,838 B1 | 4/2001 | Cherichetti et al. |
| 6,229,570 B1 | 5/2001 | Bugwadia et al. |
| 6,239,847 B1 | 5/2001 | Deierling |
| 6,259,741 B1 | 7/2001 | Chen et al. |
| 6,278,735 B1 | 8/2001 | Mohsenian |
| 6,281,942 B1 | 8/2001 | Wang |
| 6,339,434 B1 | 1/2002 | West et al. |
| 6,380,985 B1 | 4/2002 | Callahan |
| 6,418,166 B1 | 7/2002 | Wu et al. |
| 6,456,663 B1 | 9/2002 | Kim |
| 6,473,409 B1 | 10/2002 | Malvar |
| 6,499,060 B1 | 12/2002 | Wang et al. |
| 6,501,484 B1 | 12/2002 | Porter |
| 6,510,177 B1 | 1/2003 | De Bonet et al. |
| 6,529,631 B1 | 3/2003 | Peterson et al. |
| 6,535,555 B1 | 3/2003 | Bordes et al. |
| 6,556,925 B1 | 4/2003 | Mori et al. |
| 6,600,785 B1 | 7/2003 | Nishigori et al. |
| 6,625,215 B1 | 9/2003 | Faryar et al. |
| 6,678,424 B1 | 1/2004 | Ferguson |
| 6,700,933 B1 | 3/2004 | Wu et al. |
| 6,728,317 B1 | 4/2004 | Demos |
| 6,792,044 B2 | 9/2004 | Peng et al. |
| 6,823,014 B2 | 11/2004 | Kim |
| 6,873,368 B1 | 3/2005 | Yu et al. |
| 6,907,070 B2 | 6/2005 | Wu et al. |
| 6,931,060 B1 | 8/2005 | Jiang et al. |
| 6,937,291 B1 | 8/2005 | Gryskiewicz |
| 6,980,595 B2 | 12/2005 | Rose et al. |
| 6,992,725 B2 | 1/2006 | Mohsenian |
| 6,993,078 B2 | 1/2006 | Hall et al. |
| 7,010,037 B2 | 3/2006 | Ye et al. |
| 7,072,394 B2 | 7/2006 | Huang et al. |
| 7,072,525 B1 * | 7/2006 | Covell ........................ 382/261 |
| 7,079,157 B2 | 7/2006 | Deering |
| 7,154,952 B2 | 12/2006 | Tourapis et al. |
| 7,158,668 B2 | 1/2007 | Munsil et al. |
| 7,200,275 B2 | 4/2007 | Srinivasan et al. |
| 7,233,362 B2 | 6/2007 | Wu |
| 7,308,151 B2 | 12/2007 | Munsil et al. |
| 7,317,759 B1 | 1/2008 | Turaga et al. |
| 7,375,767 B2 | 5/2008 | Lee et al. |
| 7,379,608 B2 | 5/2008 | Marpe et al. |
| 7,386,049 B2 | 6/2008 | Garrido et al. |
| 7,570,834 B2 * | 8/2009 | Deshpande ................. 382/261 |
| 7,653,133 B2 | 1/2010 | Woods et al. |
| 7,747,094 B2 | 6/2010 | Sekiguchi et al. |
| 7,783,106 B2 * | 8/2010 | Cooper et al. ............... 382/173 |
| 7,876,820 B2 | 1/2011 | Auwera et al. |
| 7,956,930 B2 | 6/2011 | Sullivan |
| 7,995,656 B2 | 8/2011 | Chen et al. |
| 8,204,320 B2 | 6/2012 | Lee et al. |
| 8,638,862 B2 | 1/2014 | Sun |
| 8,750,390 B2 * | 6/2014 | Sun ................... H04N 7/26058 375/240.29 |
| 2002/0037047 A1 | 3/2002 | Van Der Schaar et al. |
| 2002/0064226 A1 | 5/2002 | Bauer et al. |
| 2002/0118743 A1 | 8/2002 | Jiang |
| 2002/0150158 A1 | 10/2002 | Wu et al. |
| 2002/0159484 A1 | 10/2002 | Azizoglu et al. |
| 2002/0181583 A1 | 12/2002 | Corbera |
| 2002/0181586 A1 | 12/2002 | Kondo et al. |
| 2002/0186890 A1 | 12/2002 | Lee et al. |
| 2002/0186894 A1 | 12/2002 | Ferguson |
| 2003/0012278 A1 | 1/2003 | Banerji et al. |
| 2003/0026339 A1 | 2/2003 | Presquet-Popescu et al. |
| 2003/0058944 A1 | 3/2003 | MacInnis et al. |
| 2003/0099298 A1 | 5/2003 | Rose et al. |
| 2003/0133500 A1 | 7/2003 | Auwera et al. |
| 2003/0161401 A1 | 8/2003 | Shen et al. |
| 2003/0185306 A1 | 10/2003 | MacInnis et al. |
| 2003/0218778 A1 | 11/2003 | Ohta |
| 2003/0235247 A1 | 12/2003 | Wu et al. |
| 2004/0013195 A1 | 1/2004 | Panusopone et al. |
| 2004/0017852 A1 | 1/2004 | Garrido et al. |
| 2004/0017853 A1 | 1/2004 | Garrido et al. |
| 2004/0042549 A1 | 3/2004 | Huang et al. |
| 2004/0101058 A1 | 5/2004 | Sasai et al. |
| 2004/0170395 A1 | 9/2004 | Filippini et al. |
| 2004/0174464 A1 | 9/2004 | MacInnis et al. |
| 2004/0208247 A1 | 10/2004 | Barrau et al. |
| 2004/0213345 A1 | 10/2004 | Holcomb et al. |
| 2004/0264567 A1 | 12/2004 | Xu et al. |
| 2005/0018771 A1 | 1/2005 | Bourge et al. |
| 2005/0021579 A1 | 1/2005 | Bae et al. |
| 2005/0063475 A1 | 3/2005 | Bhaskaran |
| 2005/0105889 A1 | 5/2005 | Conklin |
| 2005/0117641 A1 | 6/2005 | Xu et al. |
| 2005/0123207 A1 | 6/2005 | Marpe et al. |
| 2005/0147164 A1 | 7/2005 | Wu et al. |
| 2005/0152448 A1 | 7/2005 | Crinon et al. |
| 2005/0157791 A1 | 7/2005 | Sun |

(56) References Cited

U.S. PATENT DOCUMENTS

| | | |
|---|---|---|
| 2005/0185714 A1 | 8/2005 | Lin et al. |
| 2005/0195896 A1 | 9/2005 | Huang et al. |
| 2005/0195900 A1 | 9/2005 | Han |
| 2005/0220192 A1 | 10/2005 | Huang et al. |
| 2005/0259729 A1 | 11/2005 | Sun |
| 2005/0281333 A1 | 12/2005 | Ghanbari |
| 2006/0008006 A1 | 1/2006 | Cha et al. |
| 2006/0013305 A1 | 1/2006 | Sun |
| 2006/0072672 A1 | 4/2006 | Lin et al. |
| 2006/0072673 A1 | 4/2006 | Lin et al. |
| 2006/0083300 A1 | 4/2006 | Han et al. |
| 2006/0083303 A1 | 4/2006 | Han et al. |
| 2006/0083308 A1 | 4/2006 | Schwarz et al. |
| 2006/0093036 A1 | 5/2006 | Park et al. |
| 2006/0104354 A1 | 5/2006 | Han et al. |
| 2006/0120448 A1 | 6/2006 | Han et al. |
| 2006/0120450 A1 | 6/2006 | Han et al. |
| 2006/0126728 A1 | 6/2006 | Yu et al. |
| 2006/0133485 A1 | 6/2006 | Park et al. |
| 2006/0133503 A1 | 6/2006 | Park et al. |
| 2006/0133689 A1 | 6/2006 | Andersson et al. |
| 2006/0146937 A1 | 7/2006 | Ye et al. |
| 2006/0153465 A1 | 7/2006 | Zhang et al. |
| 2006/0159173 A1 | 7/2006 | Ye et al. |
| 2006/0165176 A1 | 7/2006 | Raveendran |
| 2006/0165302 A1 | 7/2006 | Han et al. |
| 2006/0193388 A1 | 8/2006 | Woods et al. |
| 2006/0245495 A1 | 11/2006 | Han et al. |
| 2006/0262985 A1 | 11/2006 | Chen et al. |
| 2006/0268991 A1 | 11/2006 | Segall et al. |
| 2006/0274959 A1 | 12/2006 | Piastowski |
| 2006/0285594 A1 | 12/2006 | Kim et al. |
| 2007/0002946 A1 | 1/2007 | Bouton et al. |
| 2007/0014349 A1 | 1/2007 | Bao et al. |
| 2007/0047644 A1 | 3/2007 | Lee et al. |
| 2007/0053431 A1 | 3/2007 | Cammas et al. |
| 2007/0081586 A1 | 4/2007 | Raveendran et al. |
| 2007/0091997 A1 | 4/2007 | Fogg et al. |
| 2007/0121723 A1 | 5/2007 | Mathew et al. |
| 2007/0140354 A1 | 6/2007 | Sun |
| 2007/0147505 A1 | 6/2007 | Bock |
| 2007/0153896 A1 | 7/2007 | Song et al. |
| 2007/0160126 A1* | 7/2007 | Van Der Meer et al. .... 375/240 |
| 2007/0160153 A1 | 7/2007 | Sullivan |
| 2007/0171969 A1 | 7/2007 | Han et al. |
| 2007/0201551 A1 | 8/2007 | Wang et al. |
| 2007/0217500 A1 | 9/2007 | Gao et al. |
| 2007/0223579 A1 | 9/2007 | Bao |
| 2007/0223582 A1 | 9/2007 | Borer |
| 2007/0230565 A1 | 10/2007 | Tourapis et al. |
| 2007/0230575 A1 | 10/2007 | Han |
| 2007/0236743 A1 | 10/2007 | Stanich et al. |
| 2007/0268964 A1 | 11/2007 | Zhao |
| 2007/0274396 A1 | 11/2007 | Zhang et al. |
| 2008/0008249 A1* | 1/2008 | Yan .......................... 375/240.21 |
| 2008/0013630 A1 | 1/2008 | Li et al. |
| 2008/0024513 A1 | 1/2008 | Raveendran |
| 2008/0063085 A1 | 3/2008 | Wu et al. |
| 2008/0068446 A1 | 3/2008 | Barkley et al. |
| 2008/0084500 A1 | 4/2008 | Rose |
| 2008/0084930 A1 | 4/2008 | Sekiguchi et al. |
| 2008/0089417 A1* | 4/2008 | Bao et al. ................. 375/240.16 |
| 2008/0095235 A1* | 4/2008 | Hsiang ..................... 375/240.13 |
| 2008/0123947 A1 | 5/2008 | Moriya et al. |
| 2008/0152000 A1 | 6/2008 | Kaushik |
| 2008/0165848 A1* | 7/2008 | Ye .......................... H04N 19/105 375/240.13 |
| 2008/0187042 A1 | 8/2008 | Jasinschi |
| 2008/0267289 A1 | 10/2008 | Yu et al. |
| 2008/0304567 A1 | 12/2008 | Boyce et al. |
| 2009/0003718 A1 | 1/2009 | Liu et al. |
| 2009/0060034 A1 | 3/2009 | Park et al. |
| 2009/0060050 A1 | 3/2009 | Park et al. |
| 2009/0097548 A1 | 4/2009 | Karczewicz et al. |
| 2009/0161756 A1 | 6/2009 | Lin |
| 2009/0207912 A1* | 8/2009 | Holcomb ............. H04N 19/159 375/240.12 |
| 2009/0219994 A1* | 9/2009 | Tu et al. .................. 375/240.08 |
| 2009/0252425 A1* | 10/2009 | Bruls et al. ..................... 382/232 |
| 2009/0262798 A1* | 10/2009 | Chiu et al. ............... 375/240.01 |
| 2009/0268818 A1* | 10/2009 | Lu et al. .................. 375/240.15 |
| 2010/0020866 A1 | 1/2010 | Marpe et al. |
| 2010/0142615 A1 | 6/2010 | Han |
| 2010/0260260 A1* | 10/2010 | Wiegand ................ H04N 19/30 375/240.12 |

FOREIGN PATENT DOCUMENTS

| | | |
|---|---|---|
| CN | 1703088 | 11/2005 |
| CN | 1722838 | 1/2006 |
| CN | 1728833 | 2/2006 |
| CN | 101040533 | 9/2007 |
| EP | 1 401 211 | 3/2004 |
| EP | 1 617 677 | 1/2006 |
| GB | 1 218 015 | 1/1971 |
| JP | 4-207684 | 7/1992 |
| JP | 2000-506687 | 5/2000 |
| JP | 2000-165661 | 6/2000 |
| JP | 2000-165866 | 6/2000 |
| JP | 2000-242774 | 9/2000 |
| JP | 2001-197527 | 7/2001 |
| JP | 2002-152498 | 5/2002 |
| JP | 2004-506355 | 2/2004 |
| JP | 2005-217940 | 8/2005 |
| JP | 2006-521039 | 9/2006 |
| JP | 2007-519273 | 7/2007 |
| JP | 2007-538439 | 12/2007 |
| JP | 2008-0350290 | 2/2008 |
| KR | 20020081777 | 10/2002 |
| RU | 2191469 | 10/2002 |
| SU | 1506554 | 9/1989 |
| WO | 94/03988 | 2/1994 |
| WO | WO 98/41029 | 9/1998 |
| WO | WO 99/09748 | 2/1999 |
| WO | 00/33581 | 6/2000 |
| WO | 00/74385 | 12/2000 |
| WO | 01/95633 | 12/2001 |
| WO | WO 02/01881 | 1/2002 |
| WO | WO 02/50772 | 6/2002 |
| WO | WO 02/054777 | 7/2002 |
| WO | WO 02/085026 | 10/2002 |
| WO | 02/096120 | 11/2002 |
| WO | WO 03/007619 | 1/2003 |
| WO | WO 03/061294 | 7/2003 |
| WO | WO 03/107683 | 12/2003 |
| WO | WO 2004/008771 | 1/2004 |
| WO | WO 2004/036919 | 4/2004 |
| WO | 2006/006777 | 1/2006 |
| WO | 2006/079997 | 8/2006 |
| WO | 2006/112620 | 10/2006 |
| WO | 2006/125713 | 11/2006 |
| WO | 2007/008286 | 1/2007 |
| WO | 2007/009875 | 1/2007 |
| WO | WO 2007/018669 | 2/2007 |
| WO | 2007/042365 | 4/2007 |
| WO | WO 2007/114617 | 10/2007 |
| WO | 2008/004816 | 1/2008 |
| WO | WO 2008/049446 | 5/2008 |

OTHER PUBLICATIONS

Yuwen, Wu "Bit-depth scalablity compatible to H.264/AVC-scalable extemsion", Jun. 19, 2008, Elsevier J. Vis. Commum. Image R 19 (2008) 372-381.*

Yuwen Wu et al., "Bit depth scalablity compatible to H.264/AVC scalable extension" Jun. 19, 2008 Elsever J. Vis Commun. Image R 19 (2008) p. 372-381.*

"10. Configuring mythfrontend," downloaded from the World Wide Web, 7 pp. (downloaded Oct. 17, 2007).

Andreopoulos et al., "A New Method for Complete-to-Overcomplete Discrete Wavelet Transforms," *Proc. IEEE Conf. Digital Signal Proc.*, 4 pp. (Jul. 2002).

(56) References Cited

OTHER PUBLICATIONS

Andreopoulos et al., "Fully-Scalable Wavelet Video Coding Using In-Band Motion Compensated Temporal Filtering," *IEEE International Conference on Acoustics, Speech, and Signal Processing. IEEE*, 4 pp. (Apr. 2003).
Andreopoulos et al., "Wavelet-Based Fully-Scalable Video Coding With In-Band Prediction," *Proc. 3rd IEEE Benelux Signal Processing Symposium* (SPS-2002), pp. S02-1 to S02-4 (Mar. 2002).
Anonymous, "Video Subgroup Schedule, 68th MPEG Meeting," 6 pp. (Mar. 2004).
Brainard et al., "Composite Television Coding: Subsampling and Interpolation," SMPTE Journal, pp. 717-724 (Aug. 1982).
Braun et al., "Motion-Compensating Real-Time Format Converter for Video on Multimedia Displays," *Proceedings IEEE 4th International Conference on Image Processing*, vol. I, pp. 125-128 (Oct. 1997).
Catmull et al., "A Class of Local Interpolating Splines," Computer Aided Geometric Design, Academic Press, pp. 317-326 (Mar. 1974).
Chang et al., "A Scalable Video Compression Technique Based on Wavelet Transform and MPEG Coding" *IEEE Trans. on Consumer Electronics*, vol. 45, No. 3, pp. 788-793 (Aug. 1999).
Chen et al., "Adaptive Joint Source-Channel Coding using Rate Shaping," *ICASSP*, 4 pp. (May 2002).
Chen et al., "Bidirectional MC-EZBC with Lifting Implementation," 26 pp. (document marked May 2003).
Chen et al., "Frame Loss Error Concealment for SVC," *Journal of Zhejiang Univ.—Science A*, vol. 7, No. 5, pp. 677-683 (May 2006).
Choi et al., "Motion-compensated 3-D subband coding of video," *IEEE Trans. on Image Processing*, vol. 8, No. 2, pp. 155-167 (Feb. 1999).
Chooi et al., "3D Subband Coder for Very Low Bit Rates" *IEEE*, pp. 405-408 (Apr. 1994).
Defee et al., "Nonlinear Filters in Image Pyramid Generation," *IEEE International Conference on Systems Engineering*, pp. 269-272 (Aug. 1991).
"DivX Multi Standard Video Encoder," 2 pp. (Downloaded from the World Wide Web on Jan. 24, 2006).
Dufaux et al., "Abstract: Motion-compensated generic coding of video based on a multi resolution data structure," 2 pp. (1993) [downloaded from the World Wide Web on Jan. 25, 2006].
Einarsson et al., "Mixed Resolution Video Coding for Low Bit-Rate Channels," *Proc. Int'l Workshop on Coding Techniques for Very Low Bit-Rate Video: VLBV97*, Linköping, Sweden, pp. 77-80 (Jul. 1997).
Elad et al., "Super-Resolution Restoration of an Image Sequence—Adaptive Filtering Approach," 24 pp. [retrieved from http://citeseer.nj.nec.com/342620.html on Apr. 30, 2001).
Gharavi et al., "Video Coding and Distribution over ATM for Multipoint Teleconferencing," GLOBECOM '93, 7 pp. (1993).
Haddad et al., "Digital Signal: Theory, Applications, and Hardware," *Computer Science Press*, pp. 257-261 (Jan. 1991).
Han et al., "Robust and Efficient Scalable Video Coding with Leaky Prediction," *IEEE Int'l Conf. on Image Processing*, vol. 2, 4 pp. (Sep. 2002).
Hsia et al., "A Parallel Median Filter with Pipelined Scheduling for Real-Time 1D and 2D Signal Processing," *IEICE Trans. Fundamentals*, vol. E83-A, No. 7, pp. 1396-1404 (Jul. 2000).
International Search Report and Written Opinion dated Feb. 17, 2010, from PCT Patent Application No. PCT/US2009/053896, 11 pp.
International Organization for Standardization, "MPEG-4 Video Verification Model version 18.0," ISO/IEC JTC1/SC29/WG11 N3908, pp. 1-10, 299-311 (Jan. 2001).
ISO/IEC, "ISO/IEC 11172-2: Information Technology—Coding of Moving Pictures and Associated Audio for Storage Media at up to About 1.5 Mbit/s," 122 pp. (Aug. 1993).
ISO/IEC 14496-10, Joint Video Team (JVT) of ISO/IEC MPEG & ITU-T VCEG, Joint Draft 6, Apr. 2006, 527 pgs.
ISO/IEC, "Information Technology—Coding of Audio-Visual Objects: Visual, ISO/IEC 14496-2, Committee Draft," 330 pp. (Mar. 1998).
ISO/IEC JTC1/SC29/WG11 MPEG2003/N6193, "Call for Proposals on Scalable Video Coding Technology," 12 pp. (Dec. 2003).
ISO/IEC JTC1/SC29/WG11 MPEG2004/W6383, "Subjective test results for the CfP on Scalable Video Coding Technology," 17 pp. (Mar. 2004).
ITU, Recommendation H.261, "Line Transmission of Non-Telephone Signals," 28 pp. (Mar. 1993).
ITU-T, "ITU-T Recommendation H.262: Information Technology—Generic Coding of Moving Pictures and Associated Audio Information: Video," 218 pp. (Jul. 1995).
ITU-T, "ITU-T Recommendation H.263: Video Coding for Low Bit Rate Communication," 167 pp. (Feb. 1998).
ITU, "ITU-T Recommendation H.264: Advanced Video Coding for generic audiovisual services," 281 pp. (May 2003).
ITU-T, "Draft ITU-T Recommendation H.263, Video Coding for Low Bitrate Communication," *Telecommunication Standardization Sector of ITU*, 53 pp. (Dec. 1995).
Iwahashi et al., "A Motion Compensation Technique for Downscaled Pictures in Layered Coding," *IEICE Transactions on Comm.*, vol. E77-B , No. 8, pp. 1007-1012 (Aug. 1994).
Ji et al., "Architectures of Incorporating MPEG-4 AVC into Three-Dimensional Wavelet Video Coding," *Picture Coding Symposium 2004*, 6 pp. (Dec. 2004).
Ji et al., "Three-Dimensional Subband Scalable Video Coding Embedded with H.264/AVC/ Codec," Proc of SPIE, vol. 5960, pp. 201-209 (Jul. 2005).
Joint Video Team (JVT) of ISO/IEC MPEG & ITU-T VCEG, "Joint Final Committee Draft (JFCD) of Joint Video Specification," JVT-D157, 207 pp. (Aug. 2002).
Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).
Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Jul. 2006).
Karlsson et al., "Subband Coding of Video for Packet Networks" *Optical Engineering*, vol. 27, No. 7, pp. 574-586 (Jul. 1988).
Keys, "Cubic Convolution Interpolation for Digital Image Processing," Computer Graphics, vol. ASSP-29, No. 6, pp. 1153-1160 (Dec. 1981).
Kim et al., "Spatio-temporal Adaptive 3-D Kalman Filter for Video," *IEEE Trans. on Image Process.*, vol. 6, No. 3, pp. 414-423 (Mar. 1997) (12 pp. printout).
Kirenko et al., "Modification of 3d Wavelet Scalable Video Coding" Philips Research Laboratories, The Netherlands, 6 pp. (document not dated).
Kopp et al., "Efficient 3×3 Median Filter Computations," Institute of Computer Graphics and Algorithms, Vienna University of Technology, Technical Report TR-186-2-94-18, 4 pp. (Dec. 1994).
Kotropoulos et al., "Adaptive LMS $L$-filters for Noise Suppression in Images," *IEEE Transactions on Image Processing*, vol. 5, No. 12, pp. 1596-1609 (1996) [48 pp. retrieved from http://citeseer.nj.nec.com/kotropoulos 96adaptive.html on Apr. 30, 2001].
Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).
Luo et al., "Advanced Lifting-based Motion Threading (MTh) Technique for the 3D Wavelet Video Coding," *Proceedings of the SPIE/IEEE Visual Communications and Image Processing (VCIP2003)*, vol. 5150, pp. 707-718 (Jun. 2003).
Luo et al., "Motion Compensated Lifting Wavelet and Its Application in Video Coding," *Proceedings of the IEEE Int. Conf. on Multimedia and Expo*, 4 pp. (Aug. 2001).
Mehrseresht et al., "Adaptively Weighted Update Steps in Motion Compensated Lifting Based on Scalable Video Compression," *Proceedings of the IEEE Int. Conf. on Image Processing*, vol. 2, 4 pp. (Sep. 2003).
Mitchell et al., "Reconstruction Filters in Computer Graphics," Computer Graphics, vol. 22, No. 4 pp. 221-228 (Aug. 1988).

(56) References Cited

OTHER PUBLICATIONS

Munsil et al., "DVD Benchmark—Special Report, The Chroma Upsampling Error and the 4:2:0 Interlaced Chroma Problem," downloaded from the World Wide Web, 19 pp. (document marked Apr. 1, 2001).
Nadenau, "Integration of Human Color Vision Models into High Quality Image Compression," Thesis, 216 pp. (2000).
Ohm, "Three Dimensional Subband Coding with Motion Compensation," *IEEE Trans. on Image Processing*, vol. 3, No. 5, pp. 559-571 (Sep. 1994).
Orton-Jay et al., "Encoding for Blu-ray Disc and HD DVD—Reaping the Benefits of Integrated Mastering," *SONIC Digital Vision*, 22 pp. (document marked Apr. 12, 2007).
Pesquet-Popescu et al., "Three-dimensional Lifting Schemes for Motion Compensated Video Compression," *ICASSP*, vol. 3, 4 pp. (2001).
Printouts of FTP directories from http://ftp3.itu.ch, 8 pp. (downloaded from the World Wide Web on Sep. 20, 2005).
Ranka et al., "Efficient Serial and Parallel Algorithm for Median Filtering," *IEEE Transactions on Signal Processing*, vol. 39, Issue 6, pp. 1462-1466 (Jun. 1991).
Reader, "History of MPEG Video Compression—Ver. 4.0," 99 pp. (document marked Dec. 16, 2003).
Reeves, "On the Selection of Median Structure for Image Filtering," *IEEE Transactions on Circuits and Systems II: Analog and Digital Signal Processing*, vol. 42, pp. 556-558 (Aug. 1995) (12 pp. printout).
Russ, "The Image Processing Handbook," 2nd Edition, CRC Press, pp. 164-166 (month unknown 1994).
Santa Cruz, "JVT-0061-CE9verif.doc," 2 pp. (downloaded from the World Wide Web on May 10, 2005.).
Schwarz et al., "Overview of the Scalable H.264/MPEG4-AVC Extension," IEEE Int'l Conf. on Image Processing, 4 pp. (Oct. 2006).
Schwarz et al., "Overview of the Scalable Video Coding Extension of the H.264/AVC Standard," IEEE Transactions on Circuits and Systems for Video Technology, 18 pp. (Sep. 2007).
Sebe et al., "An Overcomplete Discrete Wavelet Transform for Video Compression," *IEEE Int'l Conf. on Multimedia and Expo*, 4 pp. (Nov. 2002).
Secker et al., "Highly Scalable Video Compression Using a Lifting-based 3D Wavelet Transform with Deformable Mesh Motion Compensation," *IEEE Int'l Conf. on Image Processing*, vol. 3, 4 pp. (Jun. 2002).
Secker et al., "Lifting-based Invertible Motion Adaptive Transform (LIMAT) Framework for Highly Scalable Video Compression," *IEEE Trans. Image Processing*, vol. 12, 35 pp. (Dec. 2003).
Segall, "Study of Upsampling/Downsampling for Spatial Scalability," JVT-Q083, Nice, France, 18 pp. (Oct. 2005).
Ş enel et al., "Topological Median Filters," 44 pp. [Retrieved from http://citeseer.nj.nec.com/277604.html on Apr. 30, 2001].
Song et al., "Content Adaptive Update Steps for Lifting-Based Motion Compensated Temporal Filtering," *Picture Coding Symposium*, 5 pp. (Dec. 2004).
Sullivan, "Color Format Upconversion for Video Display," JVT-I019, San Diego, 6 pp. (Sep. 2003).
Sullivan et al., "The H.264/AVC Advanced Video Coding Standard: Overview and Introduction to the Fidelity Range Extensions," 21 pp. (Aug. 2004).
Sullivan, "Position Calculation for SVC Upsampling," JVT-R067, Bangkok, Thailand, 7 pp. (Jan. 2006).
Sullivan et al., "Position Calculation for SVC Upsampling," JVT-S067, Geneva, Switzerland, 12 pp. (Mar. 2006).
Sullivan, "Position Calculation for SVC Upsampling," JVT-U067, Hangzhou, China, 7 pp. (Oct. 2006).
Sun et al., "Seamless Switching of Scalable Video Bitstreams for Efficient Streaming," *IEEE Transactions on Multimedia*, vol. 6, No. 2, pp. 291-303 (Apr. 2004).
Sun et al., "Unified Solution for Spatial Scalability," JVT-R018, Bangkok, Thailand, 6 pp. (Jan. 2006).
Tomasi et al., "Bilateral Filtering for Gray and Color Images," *IEEE Int'l Conf. on Computer Vision*, 8 pp. (Jan. 1998).
Tramini et al., "Intraframe Image Decoding Based on a Nonlinear Variational Approach," *International Journal of Imaging Systems and Technology*, vol. 9, No. 5, pp. 369-380 (22 pp. prinout) (Dec. 1998).
Tsekeridou et al., "Morphological Signal Adaptive Median Filter for Still Image and Image Sequence Filtering," *IEEE Int. Symposium on Circuits and Systems*, 4 pp. (May 1998).
Turaga et al., "Content-Adaptive Filtering in the UMCTF Framework," *IEEE*, pp. I-821 through I-824 (Apr. 2003).
Tziritas et al., "A Hybrid Image Coder: Adaptive Intra-Interframe Prediction Using Motion Compensation," *Sixth MDSP Workshop*, pp. 224-230 (Sep. 1989).
Van der Schaar et al., "Unconstrained Motion Compensated Temporal Filtering (UMCTF) Framework for Wavelet Video Coding," IEEE, pp. II-581 through II-584 (Apr. 2003).
Van Roosmalen et al., "Noise Reduction of Image Sequences as Preprocessing for MPEG2 Encoding," *Proceedings of EUSIPCO*, 4 pp. (Sep. 1998).
"VC-1/PEP and Posterization," AVS Forum, downloaded from the World Wide Web, 13 pp. (document marked Apr. 27, 2007).
Video Compression 1: H 261—Multimedia Systems (Module 4 Lesson 2), 5 pp. (document not dated).
Voloshynovskiy et al., "A Stochastic Approach to Content Adaptive Digital Image Watermarking," 26 pp. (Sep. 1999).
Wang et al., "Adaptive Image Matching in the Subband Domain," *Proc. SPIE*, 12 pp. (Dec. 2004).
Wang et al., "WZS: Wyner-Ziv Scalable Predictive Video Coding," Proc. Picture Coding Symposium, 6 pp. (Dec. 2004).
Wien, "Variable Block-Size Transforms for Hybrid Video Coding," Dissertation, 182 pp. (Feb. 2004).
Wong, "Nonlinear Scale-Space Filtering and Multiresolution Systems," *IEEE Transactions on Image Processing*, vol. 4, No. 6, pp. 774-787 (Jun. 1995).
Wu et al., "SMART: An Efficient, Scalable and Robust Streaming Video System," *EURASIP on Applied Signal Processing*, vol. 2, 39 pp. (Feb. 2004).
Xiong et al., "Exploiting Temporal Correlation with Adaptive Block-size Motion Alignment for 3D Wavelet Coding," *SPIE/IEE Visual Communications and Image Processing (VCIP2004)*, 12 pp. (Jan. 2004).
Xiong et al., "Spatial Scalability in 3D Wavelet Coding with Spatial Domain MCTF Encoder," *Picture Coding Symposium*, 6 pp. (Dec. 2004).
Xu et al., "3D Sub-band Video Coding Using Barbell Lifting," MPEG2004/M10569/S05, 14 pp. (downloaded from the World Wide Web on May 10, 2005.).
Xu et al., "Three-Dimensional Embedded Subband Coding with Optimal Truncation (3D ESCOT), *Applied and Computational Harmonic Analysis*, pp. 290-315 (May 2001).
Yli-Harja et al., "Efficient Representation and Implementation of Recursive Median Filters and Their Cascade Compositions," *Proceedings of the Finnish Signal Processing Symposium*, Oulu, Finland, pp. 84-88 (May 1999).
Yli-Harja et al., "Run-length Distributions of Recursive Median Filters Using Probabilistic Automata," *Proceedings of Scandinavian Conference on Image Analysis*, Kangerlussuaq, Greenland, pp. 251-258 (Jun. 1999).
Zhao et al., "Macroblock Skip-Mode Prediction for Complexity Control of Video Encoders," *IEEE Int'l Conf. on Visual Information Engineering*, 4 pp. (Jul. 2003).
Yang et al., "A Novel Adaptive De-Interlacing Algorithm Based on Motion Compensation," Microelectronics and Computer, Issue 9, pp. 4-6 (Sep. 30, 2002).
Abhayaratne, "2D Wavelet Transforms with a Spatially Adaptive 2D Low Pass Filter," *Signal Processing Symp.*, pp. 93-96 (Jun. 2004).
Abhayaratne, "Spatially Adaptive Integer Lifting with No Side Information for Lossless Video Coding," *Picture Coding Symp.*, 6 pp. (Apr. 2003).

(56) References Cited

OTHER PUBLICATIONS

Piella et al., "An Adaptive Update Lifting Scheme with Perfect Reconstruction," *IEEE Int'l Conf. on Image Processing*, vol. 3, pp. 190-193 (Oct. 2001).
Turaga et al., "Content-adaptive filtering in the UMCTF framework," *IEEE Proc. Int'l Conf. on Acoustics, Speech and Signal Processing*, vol. 3, pp. 621-624 (Apr. 2003).
Notice on Grant of Patent dated May 14, 2013, from Chinese Patent Application No. 200980133795.0, 4 pp.
Bottreau et al., "A Fully Scalable 3D Subband Video Codec," *Proc. Int'l Conf. on Image Processing*, vol. 2, pp. 1017-1020 (Oct. 2001).
Eleftheriadis et al., "Dynamic Rate Shaping of Compressed Digital Video," *IEEE Transaction on Multimedia*, vol. 8, No. 2, Apr. 2006, pp. 297-314.
Kim et al., "Low Bit-Rate Scalable Video Coding with 3-D Set Partitioning in Hierarchical Trees (3-D SPIHT)," *IEEE Trans.on Circuits and Systems for Video Technology*, vol. 10, No. 8, pp. 1374-1387 (Dec. 2000).
Niu et al., "MPEG-4 Video Encoder Based on DSP-FPGA Techniques," *IEEE Int'l Conf. on Communications, Circuits and Systems*, vol. 1, pp. 518-522 (May 2005).
Notice on the First Office Action dated Aug. 13, 2012, from Chinese Patent Application No. 200980133795.0, 8 pp.
Notice on the Second Office Action dated Jan. 14, 2013, from Chinese Patent Application No. 200980133795.0, 8 pp.
Sun, "Resampling Process for Interlaced Materials in SVC," JVT-Rxxx, Meeting: Bangkok, Thailand, 9 pp. (Jan. 2006).
Notice on the First Office Action and Search Report dated Aug. 12, 2014, from Chinese Patent Application No. 201210424993.6, 13 pp.
ISO/IEC JTC1/SC29/WG11 M9026, "Open-Loop, In-Band, Motion-Compensated Temporal Filtering for Objective Full-Scalability in Wavelet Video Coding," 19 pp. (Oct. 2002).
List et al., "Adaptive Deblocking Filter," IEEE Trans. on Circuits and Systems for Video Technology, vol. 13, No. 7, pp. 614-619 (Jul. 2003).
Notice on the Second Office Action dated Apr. 20, 2015, from Chinese Patent Application No. 201210424993.6, 7 pp.
Supplementary Partial European Search Report dated Apr. 17, 2015, for European Patent Application No. 09811934.0, 8 pp.
Winken et al., "CE2: SVC bit-depth scalable coding," JVT-X057, 15 pp. (Jun. 2007).
Supplementary European Search Report dated Aug. 10, 2015, for European Patent Application No. 09811934.0, 11 pp.
Andreopoulos et al., "Complete-to-Overcomplete Discrete Wavelet Transforms for Scalable Video Coding with MCTF," *Proc. SPIE Visual Communications and Image Processing*, pp. 719-731 (Jul. 2003).
Bjontegaard et al., "H.263 Anchors—Technical Description," MPEG95/0322 (1995).
Chen et al., "Improved MC-EZBC with Quarter-pixel Motion Vectors," ISO/IEC JTC1/SC29/WG11, MPEG2002/m8366, Fairfax (2002).
Chen et al., "Improvements to the MC-EZBC Scalable Video Coder," ICIP 2003, vol. 2, pp. 14-17 (Sep. 2003).
ISO/IEC JTC1/SC29/WG11 MPEG2004/M11126, "Spatial Scalability in 3D Wavelet Coding with Spatial Domain MCTF Encoder," 14 pp. (Jul. 2004).
Li et al., "All-phase Motion Compensated Prediction for High Performance Video Coding," Proc. ICIP, vol. 3, pp. 538-541 (2001).
Netravali et al., "Adaptive Quantization of Picture Signals Using Spatial Masking," *Proc. IEEE*, vol. 65, pp. 536-548 (1977).
Sullivan, "Color Format Upconversion for Video Display," JVT-I019r2, San Diego, 6 pp. (Sep. 2003).
Sullivan, "Resampling Filters for SVC Upsampling," JVT-R066, Bangkok, Thailand, 9 pp. (Jan. 2006).
Ye et al., "Fully Scalable 3-D Overcomplete Wavelet Video Coding using Adaptive Motion Compenstated Temporal Filtering," *Proc. SPIE Visual Communications and Image Processing*, pp. 1169-1180 (Jul. 2003).
Notice on Grant of Patent dated Oct. 22, 2015, from Chinese Patent Application No. 201210424993.6, 4 pp.

\* cited by examiner

Software 180 Implementing Conversion Operations in
Scalable Video Encoding and/or Decoding

CONVERSION OPERATIONS IN SCALABLE VIDEO ENCODING AND DECODING

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

When it converts video to a lower bit rate form, a video encoder can decrease the quality of the compressed video to reduce bit rate. By selectively removing detail in the video, the encoder makes the video simpler and easier to compress, but the compressed video is less faithful to the original video. Aside from this basic quality/bit rate tradeoff, the bit rate of the video depends on the content (e.g., complexity) of the video and the format of the video.

Video information is organized according to different formats for different devices and applications. Attributes of video format can include color space, chroma sampling rate, sample depth, spatial resolution and temporal resolution. Typically, quality and bit rate vary directly for spatial resolution (e.g., detail in a picture) and temporal resolution (e.g., number of pictures per second), with higher spatial resolution or higher temporal resolution resulting in higher quality but also resulting in higher bit rate.

In video encoding and decoding applications, common color spaces include YUV and YCbCr. Y indicates the brightness (luma) component of the video, while U and V, or Cb and Cr, indicate color (chroma) components of the video. Aside from YUV and YCbCr, many other color spaces organize video in a luma channel and chroma channels.

Chroma sampling rate refers to sampling of the chroma channels of video relative to the luma channel. In the YUV color space, for example, one chroma sampling rate is 4:4:4, which indicates that for every Y sample, corresponding U and V samples are present. The human eye is more sensitive to variations in brightness than color, however, and encoders have been developed to take advantage of this fact. Another chroma sampling rate is 4:2:2, which indicates that a single U sample and a single V sample correspond to two horizontal Y samples. Chroma sampling rates at lower resolution, such as 4:2:2 or 4:2:0, result in fewer samples and typically require fewer bits to encode than higher resolution chroma sample rates, such as 4:4:4. Because of the prevalence of 4:2:0 chroma sampling, certain video encoders accept video in 4:2:0 format, but not source formats with higher chroma resolution.

Each picture element ("pixel") of a video picture includes one or more samples, and each sample is digitally represented with one or more bits. Studios and content producers often use video with 10 bits per sample or 12 bits per sample to represent sample values more precisely, with more gradations of brightness or color. Using higher sample depth allows for greater precision in sample values, or allows for capturing a wider color gamut. For example, 12-bit sample values have more possible values than 10-bit sample values or 8-bit sample values. As a tradeoff for this higher quality, higher sample depth tends to increase bit rate for encoding and decoding applications. Many encoders accept video with 8-bit samples, according to convention.

Scalable video encoding and decoding facilitate delivery of video to devices with different capabilities. A typical scalable video encoder splits video into a base layer and one or more enhancement layers. The base layer alone provides the video for reconstruction at a lower resolution, and the enhancement layer(s) can be added to provide extra information that will increase video quality. Some scalable encoders and decoders rely on temporal scalability of video. Other common scalable encoding/decoding schemes involve scalability for either the spatial resolution or the overall encoding quality of the video.

Scalable video codecs that support temporal scalability, spatial scalability and/or overall encoding quality scalability provide many options for base and enhancement layers. While these types of scalability provide acceptable performance in many scenarios, they do not have the benefits and advantages of the techniques and tools described below.

SUMMARY

In summary, the detailed description presents techniques and tools for conversion operations between modules in a scalable video encoding tool or scalable video decoding tool. For example, when base layer video has a low sample depth and/or low color fidelity, the conversion operations help improve the efficiency of encoding inter-layer residual video with a higher sample depth and/or higher color fidelity.

According to a first aspect of the techniques and tools described herein, a tool such as a scalable video encoding tool or scalable video decoding tool receives base layer video after reconstruction of the base layer video. The reconstructed base layer video has sample values with a first sample depth (e.g., 8 bits per sample). The tool filters the reconstructed base layer video using an adaptive lowpass filter and upsamples the sample values to a second sample depth (e.g., 10 bits per sample). The tool can also perform inverse tone mapping on the results of the filtering and upsampling. The adaptive lowpass filter, which can be adapted to remove encoding artifacts or dithering values in the reconstructed base layer video, can be adjusted according to filter strength parameters that are signaled by the encoding tool to the decoding tool.

According to a second aspect of the techniques and tools described herein, a tool such as a scalable video encoding tool or scalable video decoding tool receives base layer video after reconstruction of the base layer video. The reconstructed base layer video has a luma channel and multiple chroma channels with a first chroma sampling rate (e.g., 4:2:0). The tool scales each of the chroma channels to a second chroma sampling rate (e.g., 4:2:2). The scaling uses a type of chroma upsampling indicated by one or more chroma scaling parameters that are signaled by the encoding tool to the decoding tool. For example, the chroma scaling parameter(s) indicate a selection between linear interpolation and cubic interpolation for the chroma upsampling.

According to a third aspect of the techniques and tools described herein, a tool such as a scalable video encoding tool receives inter-layer residual video that has sample values selected from a first sample value set. The encoding tool converts the sample values to a second sample value set, mapping the sample values between the first and second sample value sets according to one or more set remapping parameters. The encoding tool signals the set remapping parameter(s) to a scalable video decoding tool. The decoding tool receives inter-layer residual video (with sample values selected from the second sample value set) and performs inverse remapping to map sample values between the second and first sample value sets according to the one or more set remapping parameters.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Figure 1:
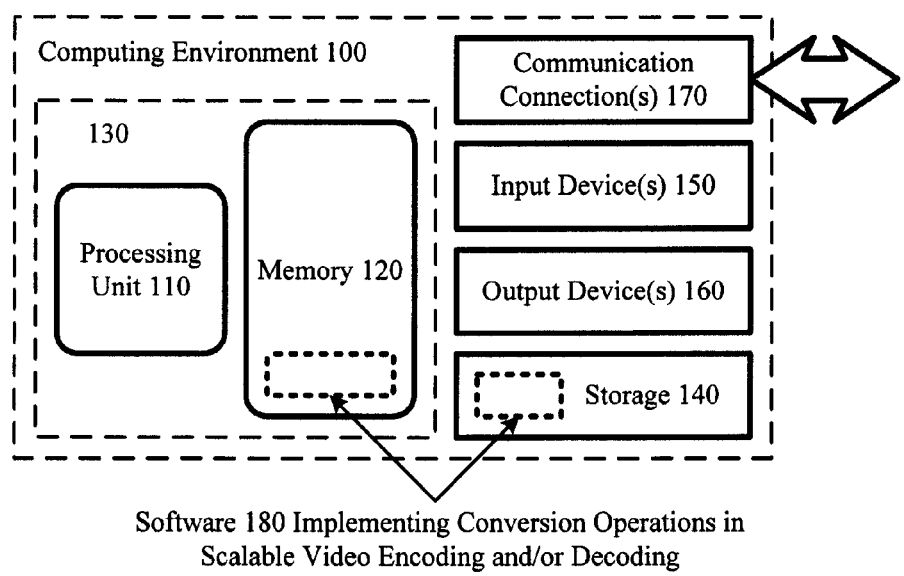
FIG. 1 is a block diagram of a suitable computing environment in which several described techniques and tools may be implemented.

The present application relates to techniques and tools for conversion operations between modules in a scalable video encoding tool or scalable video decoding tool. In particular, when scalable video encoding and decoding use base layer video with low sample depth and/or low color fidelity, the conversion operations help improve the efficiency of encoding inter-layer residual video for video with a higher sample depth and/or higher color fidelity.

For example, many existing video codecs work with video in 4:2:0 YCbCr format having 8-bit samples. Video content for high-quality entertainment applications may have higher sample depth or color fidelity, however, and may use a wider color gamut. To encode such content, a preprocessor reduces image fidelity to 8-bit 4:2:0 YCbCr video before a base layer video encoder encodes the content. Some display devices work with samples having a higher bit depth (e.g., 10 bits per sample) or wider color gamut. To deliver high fidelity video to such display systems, some scalable video codecs use an 8-bit 4:2:0 YCbCr encoder for a base layer version of the video, and use one or more enhancement layers of inter-layer residual video to represent differences between the base layer version and the original video. The techniques and tools described herein help scalable video encoding and decoding tools convert video from a lower resolution format (e.g., 4:2:0 YCbCr video with 8-bit samples in a limited color gamut) to a higher resolution format (e.g., 4:2:2 YCbCr video with 10-bit samples in a wider color gamut) in ways that make compression of inter-layer residual video more effective.

One aspect of the conversion operations involves inverse scaling reconstructed base layer video to invert sample depth scaling that was performed before encoding. The inverse scaling combines adaptive lowpass filtering with sample depth upsampling to reach a higher sample depth. In many scenarios, the filtering and upsampling process reduces artifacts (e.g., blocking artifacts or, more generally, quantization noise) while also increasing the sample depth. Subsequent inverse tone mapping (e.g., from one color gamut to another) can be conducted at the same sample depth or a higher sample depth. This approach helps reduce energy in inter-layer residual video by making the reconstructed base layer video closer to the input video, and thereby helps make compression of the inter-layer residual video more efficient.

Another aspect of the conversion operations involves inverse scaling of reconstructed base layer video to invert chroma sampling rate scaling that was performed before encoding. The inverse scaling uses an adaptive upsampling process to restore a higher chroma sampling rate. For example, an encoding tool or decoding tool switches between linear interpolation and cubic interpolation when upsampling sample values to a higher chroma sampling rate in the chroma channels. By adapting the chroma upsampling, the encoding tool can reduce energy in inter-layer residual video and make compression of the inter-layer residual video more efficient.

A third aspect of the conversion operations involves remapping and inverse remapping of inter-layer residual video. In some scenarios, the differences between input video and reconstructed base layer video exceed the dynamic range of the encoder and decoder used for enhancement layer video. In other scenarios, the differences have such a small dynamic range that encoding them with the enhancement layer encoder, even at the highest quality allowed, does not preserve the differences. To address such problems, a scalable video encoding tool remaps inter-layer residual video according to remapping parameters and encodes the remapped inter-layer residual video. A corresponding scalable video decoding tool decodes the remapped inter-layer residual video and inverse remaps the inter-layer residual video. By adapting the remapping parameters, the encoding tool can adjust the dynamic range of the inter-layer residual video to facilitate efficient encoding by the enhancement layer encoder.

Various alternatives to the implementations described herein are possible. Certain techniques described with reference to flowchart diagrams can be altered by changing the ordering of stages shown in the flowcharts, by splitting, repeating or omitting certain stages, etc. The different aspects of the conversion operations can be used in combination or separately. Different embodiments implement one or more of the described techniques and tools.

Some of the techniques and tools described herein address one or more of the problems noted in the background. Typically, a given technique/tool does not solve all such problems. Rather, in view of constraints and tradeoffs in encoding time, encoding resources, decoding time, decoding resources, available bit rate, and/or quality, the given technique/tool improves performance for a particular implementation or scenario.

I. Computing Environment

FIG. 1 illustrates a generalized example of a suitable computing environment (100) in which several of the described techniques and tools may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing one or more of the described conversion operations for scalable video coding and/or decoding.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the conversion operations.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "select" and "reconstruct" to describe computer operations in a computing environment. These terms are high-level abstractions for operations performed by a computer, and should not be confused with acts performed by a human being. The actual computer operations corresponding to these terms vary depending on implementation.

II. Generalized Encoding Tool

Figure 2:
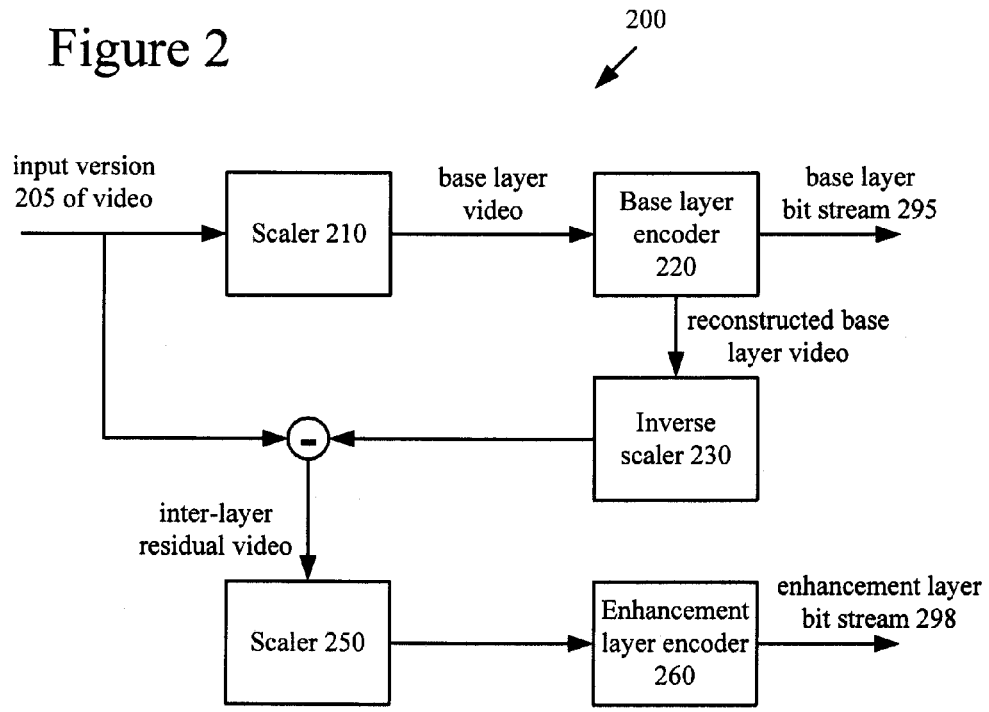
FIG. 2 is a block diagram of a scalable video encoding tool in which several described techniques may be implemented.

FIG. 2 is a block diagram of a generalized scalable video encoding tool (200) in conjunction with which some described techniques may be implemented. The encoding tool (200) receives a sequence of video pictures including an input picture (205) and produces a base layer bit stream (295) and one or more enhancement layer bit streams (298). For the base layer, the format of the output bitstream can be a Windows Media Video format, SMPTE 421-M format, MPEG-x format (e.g., MPEG-1, MPEG-2, or MPEG-4), H.26x format (e.g., H.261, H.262, H.263, or H.264), or other format. For the enhancement layer(s), the format of the output bitstream(s) can be the same as the base layer bitstream or another format.

The tool (200) processes video pictures. The term "picture" generally refers to source, coded, or reconstructed image data. For progressive video, a picture is a progressive video frame. For interlaced video, a picture may refer to an interlaced video frame, the top field of the frame, or the bottom field of the frame, depending on context.

An input picture (205) has a sample depth, chroma sampling rate and/or spatial resolution that is at a higher resolution than the base layer encoder (220) accepts. For example, the base layer encoder (220) is configured to encode video pictures with 8-bit samples and a 4:2:0 chroma sampling rate, and the input picture (205) has 10-bit samples and a 4:2:2 chroma sampling rate, or has another format with higher resolution than 8-bit 4:2:0. Alternatively, the base layer encoder (220) accepts 10-bit samples, 12-bit samples, or samples with some other sample depth, or the base layer encoder (220) accepts 4:2:2 video, 4:4:4 video, or video having some other chroma sampling rate.

The encoding tool (200) includes a first scaler (210) which accepts input video pictures (205) and outputs base layer video to the base layer encoder (220). The first scaler (210) may downsample or otherwise scale the input video pictures (205), for example, to reduce sample depth, spatial resolution and/or chroma sampling resolution. For sample depth downsampling, the scaler (210) can clip the least significant x bits of a sample, use tone mapping to map sample values in one sample depth (e.g., 10 bits per sample) to another sample depth (e.g., 8 bits per sample), or use another mechanism. For chroma sub-sampling, the scaler (210) can use sample dropping, lowpass filtering, or another mechanism. The scaler (210) can selectively add a dithering signal to improve the perceptual quality of the base layer video standing alone. Or, for one or more of these attributes of the input video pictures (205), the first scaler (210) does not alter the input video pictures (205) at all.

Generally, tone mapping is a technique of mapping one set of colors to another set of colors. Tone mapping can use a simple linear function, segmented linear functions, table lookup operations, or other operator for mapping. For example, tone mapping maps a set of $2^{30}$ possible color values (three 10-bit samples per pixel) to an arbitrary subset of $2^{24}$ possible values (three 8-bit samples per pixel). The arbitrary subset can represent colors in the same color gamut but leave out possible colors, or it can represent colors in a smaller gamut with fine gradations, or it can arbitrarily reassign colors.

For example, in some encoding scenarios, the scaler (210) accepts studio-quality video with high sample depth and high chroma sampling rate, filters and downsamples the video, adds a dithering signal, and outputs base layer video with a lower sample depth and lower chroma sampling rate. In other encoding scenarios, the scaler (210) accepts video that has already been downsampled in terms of sample depth and combined with a dithering signal, then downsamples the chroma sampling rate of the video to produce base layer video. In still other encoding scenarios, the scaler (210) accepts video with a high sample depth and high chroma sampling rate, to which a dithering signal has been added, then downsamples the video to produce base layer video with a lower sample depth and lower chroma sampling rate.

The base layer encoder (220) encodes the base layer video and outputs a base layer bit stream (295). In addition, the base layer encoder (220) makes available reconstructed base layer video, which is input to an inverse scaler (230). As part of encoding, the base layer encoder (220) typically produces a reconstructed version of the input picture (205). For example, the base layer encoder (220) decodes and buffers a reconstructed base layer picture for use in later motion compensation. The reconstructed version is thus available from the base layer encoder (220) for further processing in the scalable encoding. (Alternatively, a base layer decoder (not shown) in the encoding tool (200) decodes the base layer bit stream (295) to produce the reconstructed base layer video.)

If the reconstructed base layer video has a different sample depth, spatial resolution, chroma sampling rate, etc. than the input video pictures (205) due to scaling, then the inverse scaler (230) may upsample or otherwise inverse scale the reconstructed base layer video so that it has a higher sample depth, spatial resolution, chroma sampling rate, etc. (e.g., the same sample depth, spatial resolution, chroma sampling rate, etc. as the input video pictures (205)). The inverse scaler (230) can also adaptively filter the reconstructed base layer video to remove certain kinds of artifacts (e.g., blocking artifacts, dithering signals). For example, while it filters the reconstructed base layer video using an adaptive lowpass filter, the inverse scaler (230) upsamples sample values of the reconstructed base layer video to a higher sample depth, and then the inverse scaler (230) upsamples the chroma channels of the reconstructed base layer video to the chroma sampling rate of the input video picture (205). In addition, to compensate for tone mapping during scaling, the inverse scaler (230) can perform inverse tone mapping (e.g., from one color gamut to another) at the same sample depth or a higher sample depth. Details of inverse scaling operations for reconstructed base layer video in example implementations are presented below. Alternatively, the inverse scaler (230) uses another mechanism to inverse scale the reconstructed base layer video, for example, sample value repetition for chroma upsampling.

The steps of scaling and encoding the input video typically result in some loss of data between the input video and the reconstructed base layer video. Generally, inter-layer residual video represents differences (but not necessarily all differences) between the reconstructed base layer video and the input video. In the tool (200) of FIG. 2, a differentiator subtracts samples of the reconstructed base layer video from corresponding samples of the input video to produce this inter-layer residual video. Before the differentiator, the input video may be additionally filtered.

The second scaler (250) scales the inter-layer residual video for input to an enhancement layer video encoder (260). For example, the second scaler (250) remaps the sample values of the inter-layer residual video so that the sample values have a distribution that facilitates effective compression with the enhancement layer video encoder (260). Details of scaling operations for inter-layer residual video in example implementations are presented below. Alternatively, the second scaler (250) uses another mechanism to scale the inter-layer residual video.

The enhancement layer encoder (260) compresses the inter-layer residual video and produces an enhancement layer bit stream (298). A "picture" at a given time in the inter-layer residual video represents differences between an input video picture and a reconstructed base layer video picture, but is still encoded as a picture by the example enhancement layer video encoder (260). The enhancement layer bit stream (298) can also include parameters for the adaptive lowpass filter and upsampling by the inverse scaler (230) and parameters for the remapping by the second scaler (250).

Although FIG. 2 shows a single enhancement layer encoder (260), the inter-layer residual video can itself be separated into multiple layers of residual video for encoding with separate residual encoders. For example, a decomposer uses wavelet decomposition or another suitable decomposition mechanism to split the inter-layer residual video into a chroma highpass residual layer and a sample depth residual layer, which are then encoded by a chroma highpass encoder and sample depth residual encoder, respectively, to produce two separate enhancement layer bit streams.

A controller (not shown) receives inputs from various modules of the tool (200) and evaluates intermediate results during encoding. The controller works with modules such as the inverse scaler (230) and second scaler (250), as well as modules within the base layer encoder (220) and the enhancement layer encoder (260) to set and change coding parameters during encoding. The tree of coding parameter decisions to be evaluated, and the timing of corresponding encoding, depends on implementation. In some embodiments, the controller also receives input from an encoding session wizard interface, from another encoder application interface, or from another source to designate video to be encoded using specific rules.

The relationships shown between modules within the tool (200) indicate general flows of information; other relationships are not shown for the sake of simplicity. In particular, FIG. 2 generally does not show side information for the inverse scaler (230) and second scaler (250). Such side information, once finalized, is sent in an output bit stream or side channel. Particular embodiments of scalable video encoding tools typically use a variation or supplemented version of the tool (200). Depending on implementation and the type of compression desired, modules can be added, omitted, split into multiple modules, combined with other modules, and/or replaced with like modules. In alternative embodiments, scalable video encoding tools with different modules and/or other configurations of modules perform one or more of the described techniques.

III. Generalized Decoding Tool

Figure 3:
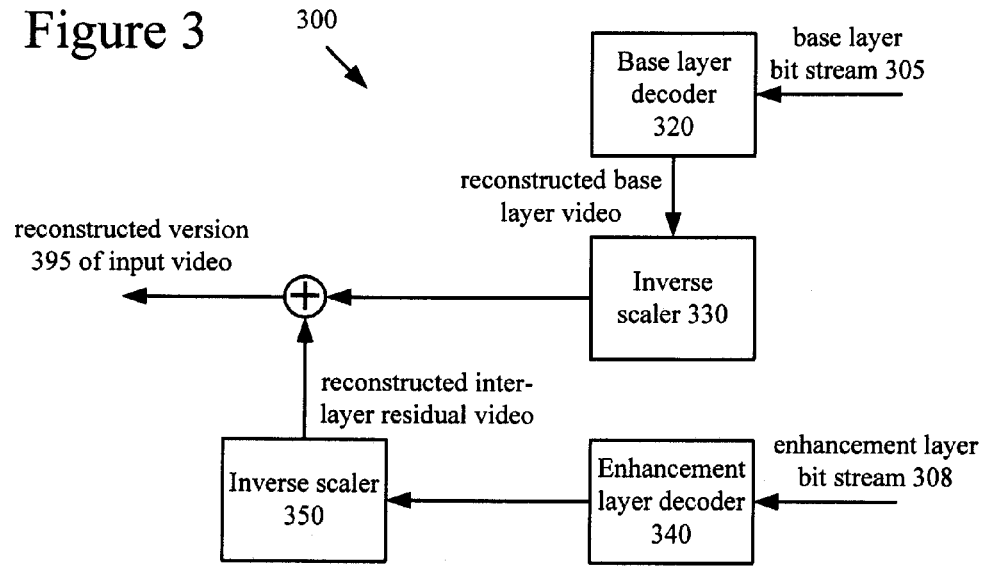
FIG. 3 is a block diagram of a scalable video decoding tool in which several described techniques may be implemented.

FIG. 3 is a block diagram of a generalized scalable video decoding tool (300) in conjunction with which some described techniques may be implemented. The decoding tool (300) receives one or more bit streams of compressed video information (including bit streams for different layers) and produces reconstructed video (395). For base layer video, the format of the base layer bit stream (305) can be a Windows Media Video format, SMPTE 421-M format, MPEG-x format (e.g., MPEG-1, MPEG-2, or MPEG-4), H.26x format (e.g., H.261, H.262, H.263, or H.264), or other format. For inter-layer residual video, the format of the enhancement layer bit stream(s) (308) can be the same as the base layer bit stream (305), or it can be another format.

The decoding tool (300) includes a base layer decoder (320) that receives the base layer bit stream (305) and outputs reconstructed base layer video to a first inverse scaler (330). If the reconstructed base layer video has a different sample depth, spatial resolution, chroma sampling rate, etc. than the output video (due to scaling during encoding), then the first inverse scaler (330) upsamples or otherwise inverse scales the reconstructed base layer video so that it has a higher sample depth, spatial resolution, chroma sampling rate, etc. (e.g., the same sample depth, spatial resolution, chroma sampling rate, etc. as the output video (395)). The first inverse scaler (330) can also adaptively filter the reconstructed base layer video to remove certain kinds of artifacts (e.g., blocking artifacts, dithering signals). For example, while it filters the reconstructed base layer video using an adaptive lowpass filter, the first inverse scaler (330) upsamples sample values of the reconstructed base layer video to a higher sample depth, and then upsamples the chroma channels of the reconstructed base layer video to a higher chroma sampling rate. The inverse scaler (330) can also perform inverse tone mapping at the same sample depth or a higher sample depth. Details of inverse scaling operations for reconstructed base layer video in example implementations are presented below. The enhancement layer bit stream(s) (308) can include parameters that control operation of the adaptive lowpass filter and upsampling by the first inverse scaler (330). Alternatively, the first inverse scaler (330) uses another mechanism to inverse scale the reconstructed base layer video.

The decoding tool (300) also includes an enhancement layer decoder (340) operable to receive an enhancement layer bit stream (308) and output decoded inter-layer residual video to a second inverse scaler (350). The second inverse scaler (350) inverse scales the inter-layer residual video. For example, the second inverse scaler (350) remaps sample values of the inter-layer residual video to invert mapping that was performed during encoding. Details of inverse scaling operations for inter-layer residual video in example implementations are presented below. The enhancement layer bit stream(s) (308) can include parameters that control operation of the remapping by the second inverse scaler (350). Alternatively, the second inverse scaler (350) uses another mechanism to inverse scale the inter-layer residual video.

Although FIG. 3 shows a single enhancement layer decoder (340), the inter-layer residual video can itself be separated into multiple layers (signaled as multiple enhancement layer bit streams) for decoding with separate enhancement layer decoders.

In some cases, one or more of the enhancement layer bit streams is not present. This may happen, for example, if the bit stream is corrupted during transmission or on the storage media. Or, for some types of playback devices or some decoding scenarios, an enhancement layer bit stream is selectively dropped by a transmitter or by the decoding tool (300) so as to reduce bit rate or reduce decoding complexity.

The decoding tool (300) combines the reconstructed base layer video that is output by the first inverse scaler (330) with the reconstructed inter-layer residual video (if present) that is output from the second inverse scaler (350) to produce reconstructed video (395) for output. If layers of inter-layer residual video were separated by wavelet decomposition or another mechanism during encoding, the decoding tool (300) can combine the reconstructed residual layers using wavelet synthesis or another mechanism before combining the resultant inter-layer residual video with the reconstructed base layer video.

The relationships shown between modules within the decoding tool (300) indicate general flows of information in the decoding tool (300); other relationships are not shown for the sake of simplicity. Particular embodiments of video decoding tools typically use a variation or supplemented version of the generalized decoding tool. Depending on implementation and the type of decompression desired, modules of the decoding tool can be added, omitted, split into multiple modules, combined with other modules, and/or replaced with like modules. In alternative embodiments, decoding tools with different modules and/or other configurations of modules perform one or more of the described techniques.

IV. Adaptive Filtering and Upsampling of Reconstructed Base Layer Video

In some embodiments, after the sample depth of input video is scaled before base layer encoding, a scalable video encoding tool and decoding tool perform inverse scaling of reconstructed base layer video using a combination of adaptive lowpass filtering and upsampling. The filtering and upsampling processes can reduce image artifacts while also increasing the sample depth. Subsequent tone mapping (e.g., from one color gamut to another) is optionally conducted at the same sample depth or a higher sample depth. This approach helps handle coding errors and artifacts (e.g., blocking artifacts, banding artifacts or, more generally, quantization noise) in the reconstructed base layer video. By adapting the filtering to make the reconstructed base layer video more closely approximate the input video, the scalable video encoding tool can reduce the energy of the inter-layer residual video, and thereby improve compression efficiency.

Adaptive lowpass filtering and upsampling have advantages compared to other approaches to inverse scaling. For example, one approach to restoring sample depth in reconstructed base layer video is to map sample values to higher sample depth through direct pixel-to-pixel mapping. While this approach is simple, coding errors or banding artifacts caused by limited sample depth in the base layer video can be easily propagated to inter-layer residual video. Adaptive filtering and upsampling can help remove such artifacts.

Adaptive filtering and upsampling can also help improve quality in another way. In some encoding scenarios, an encoding tool adds a dithering signal during preprocessing of base layer video then encodes the base layer video with the added dithering signal. Although the dithering signal improves perceptual quality when the base layer video is played back by itself, the dithering signal can add energy to inter-layer residual video in scalable video encoding. Therefore, the encoding tool and decoding tool use a lowpass filter adapted to remove the added dithering signal. The adaptive lowpass filter can at the same time remove compression artifacts such as blocking artifacts and banding artifacts to reduce the energy of the inter-layer residual video.

A. Techniques for Adaptive Filtering and Upsampling

Figure 4:
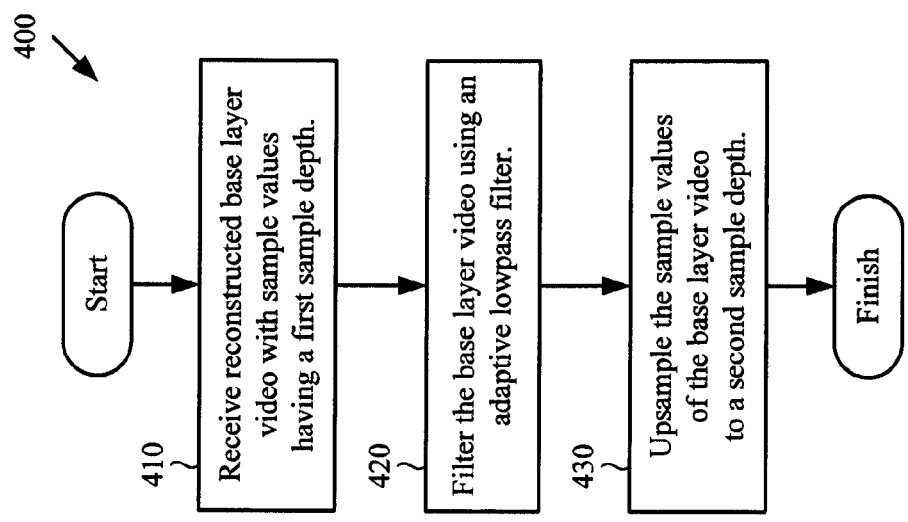
FIG. 4 is a flow chart of a generalized technique for upsampling sample values of base layer video to a higher sample depth and adaptively filtering the video during scalable video encoding or decoding.

FIG. 4 shows a generalized technique (400) for adaptive lowpass filtering and upsampling of reconstructed base layer video. A tool such as the scalable video encoding tool (200) of FIG. 2, scalable video decoding tool (300) of FIG. 3, or other tool performs the technique (400).

To start, the tool receives (410) reconstructed base layer video with sample values that have a first sample depth. For example, the reconstructed base layer video has 8-bit samples. Alternatively, the samples of the reconstructed base layer video have some other sample depth.

In some implementations, the tool also gets one or more filter strength parameters for the lowpass filter. For example, during encoding, an encoding tool selects the filter strength parameter(s) (e.g., after evaluating different values of filter strength parameter(s), or after estimating which values of filter strength parameter(s) will provide good performance). The encoding tool later signals the filter strength parameter(s) as side information in an enhancement layer bit stream or side information signaled out of band. During decoding, a decoding tool parses the filter strength parameter(s) from an enhancement layer bit stream (or side channel) and adjusts the lowpass filter. Example filter strength parameters are presented below. Alternatively, the tool uses other filter strength parameters. The filter strength parameter(s) can change on a picture-by-picture channel-by-channel basis, or on some other basis.

The tool filters (420) the base layer video using the adaptive lowpass filter and upsamples (430) the sample values of the base layer video to a second sample depth higher than the first sample depth. For example, the tool performs the filtering and upsampling using a filter of one of the example implementations below to remove or smooth artifacts (e.g., blocking artifacts, dithering signals) while also restoring sample depth to a higher level. Alternatively, the tool performs the filtering and upsampling using another filter.

The tool performs the technique (400) on a picture-by-picture basis using a sliding window through a reconstructed base layer video picture, or it performs the technique (400) on some other basis. Although FIG. 4 shows the filtering (420) before the upsampling (430), in practice, the filtering (420) and upsampling (430) can be performed in combination on a sample-by-sample basis in a sliding window, or they can be performed in some other order. Before or after the filtering and upsampling, the tool can perform inverse tone mapping (not shown in FIG. 4) on the sample values of the reconstructed base layer video, to compensate for tone mapping performed as part of scaling before base layer encoding.

Figure 10A:
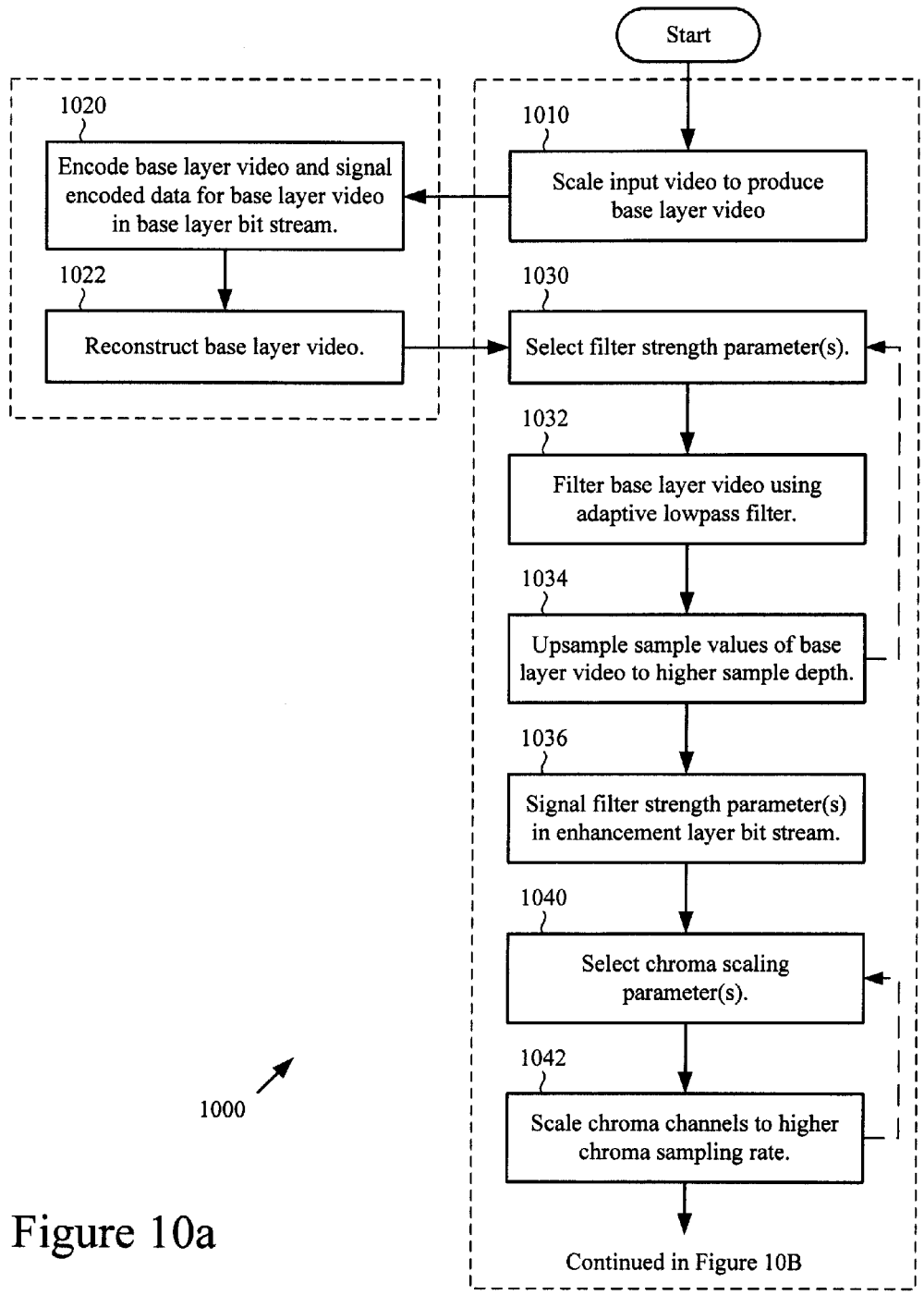
FIGS. 10a and 10b are a flow chart of a technique for scalable video encoding with sample depth upsampling and adaptive filtering of base layer video, scaling of chroma channels of the base layer video and remapping of sample values of inter-layer residual video.
Figure 10B:
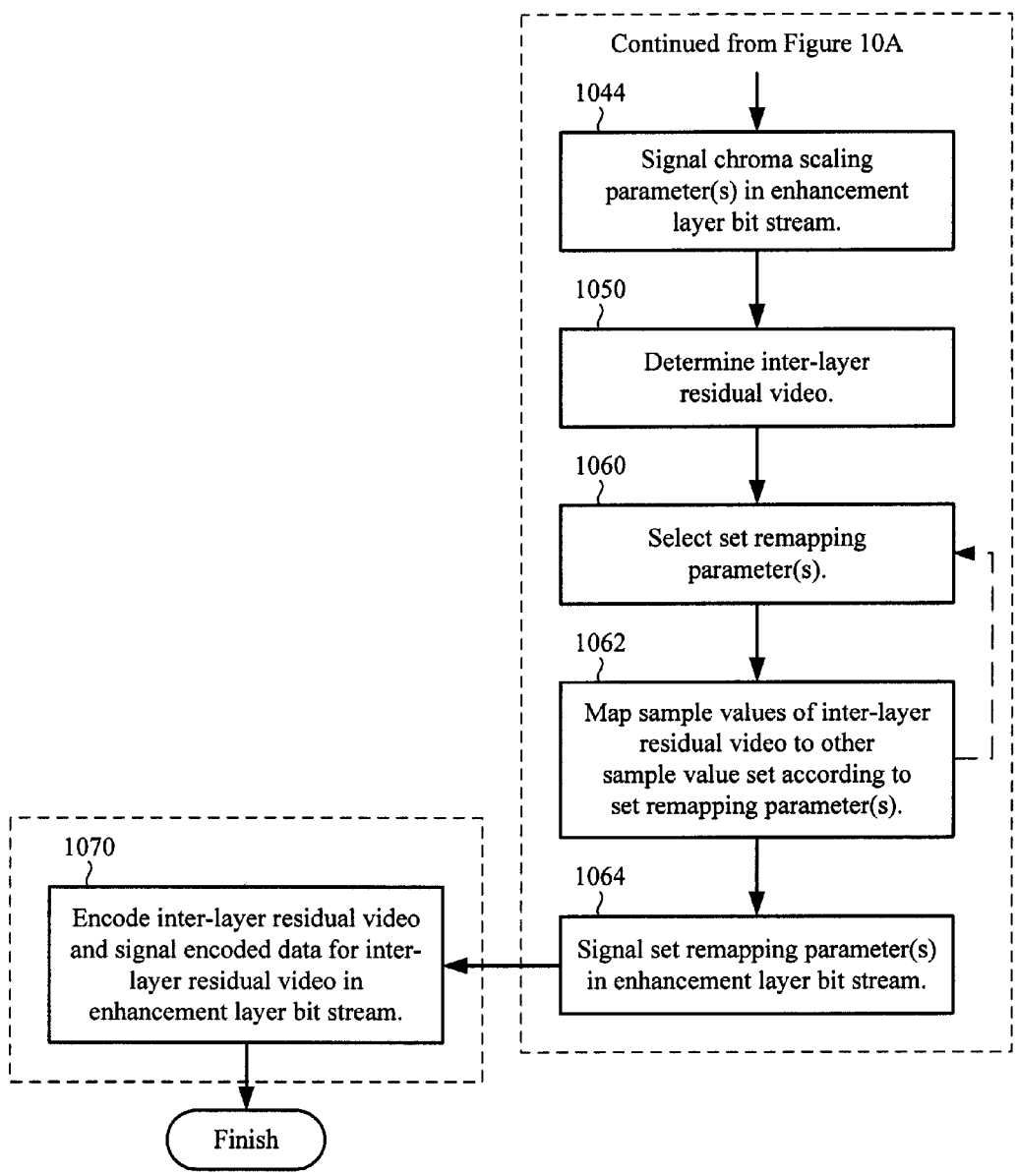
Figure 11A:
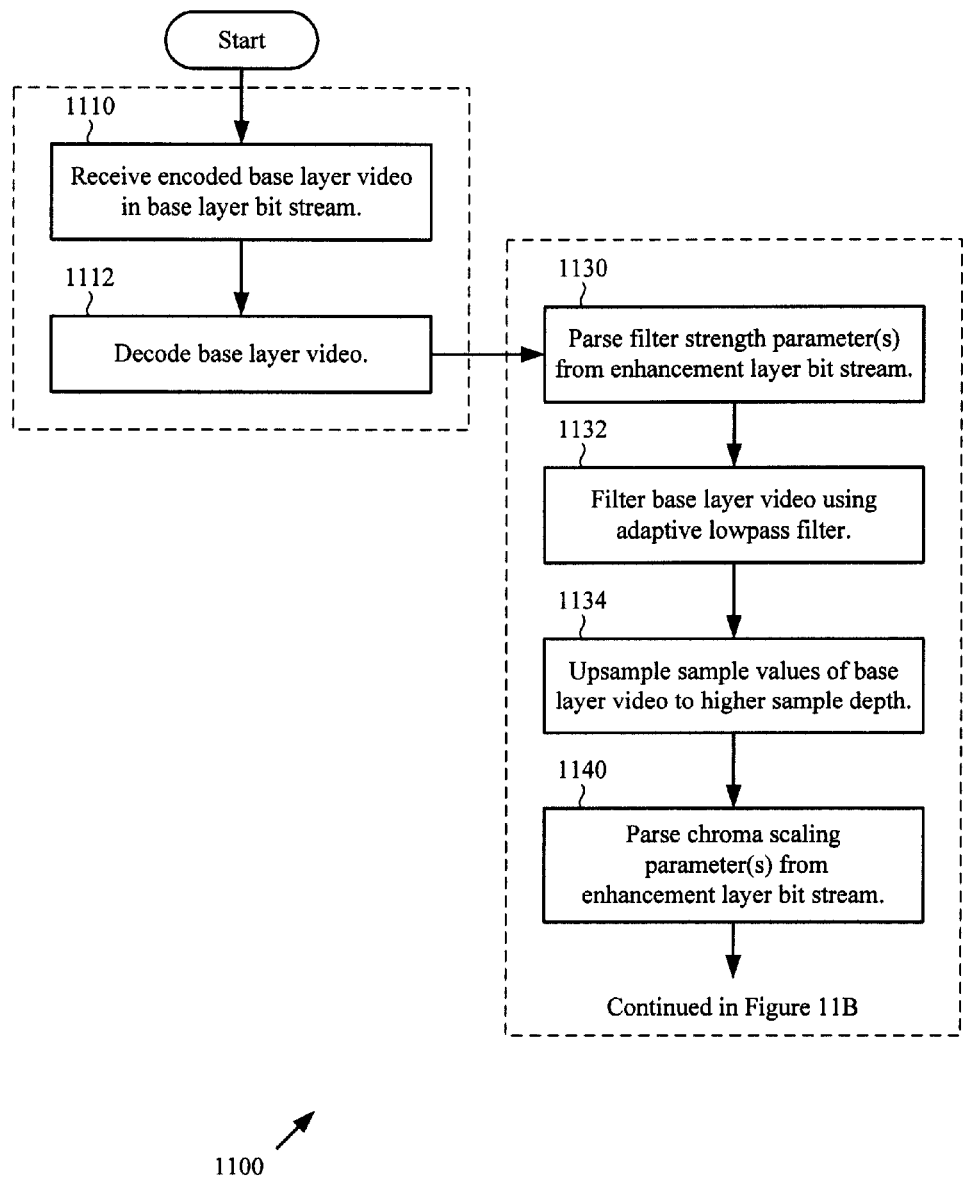
FIGS. 11a and 11b are a flow chart of a technique for scalable video decoding corresponding to the scalable video encoding of FIGS. 10a and 10b.
Figure 11B:
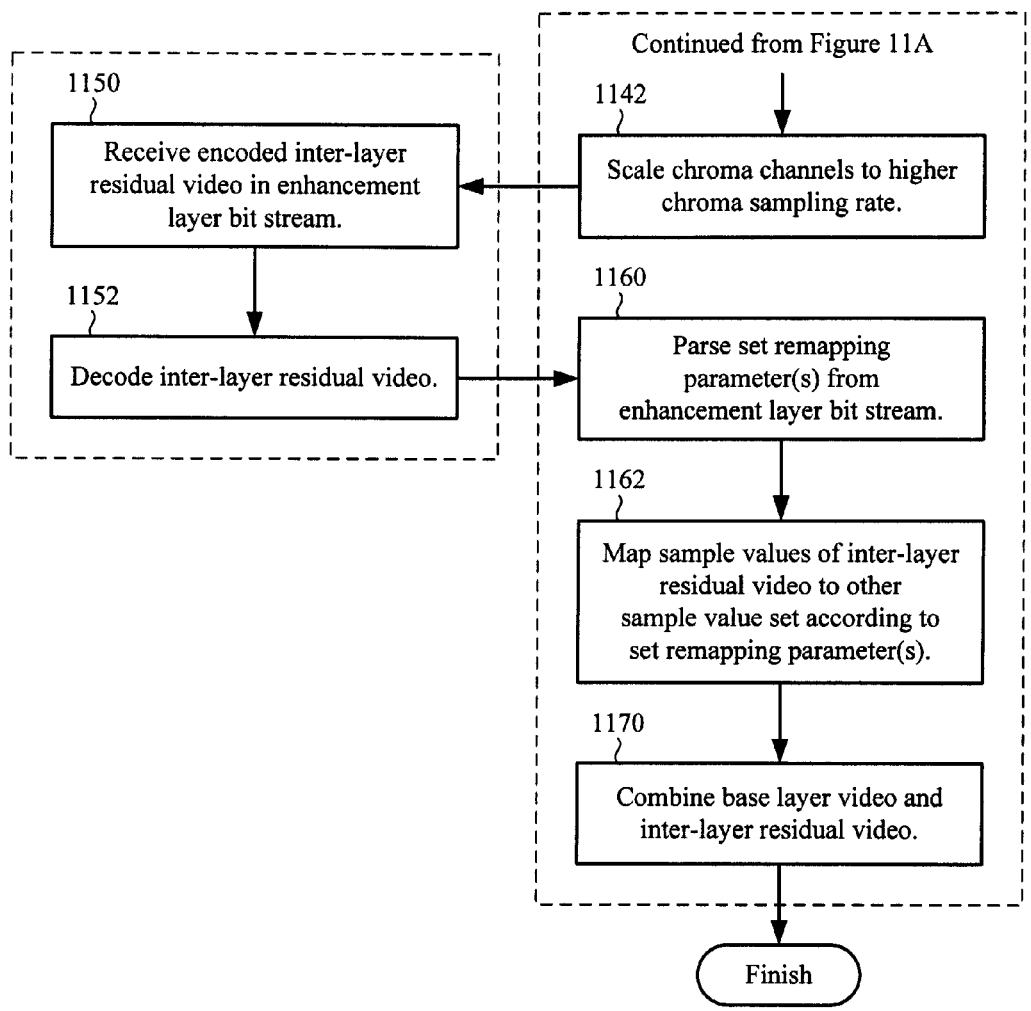

FIGS. 10a and 10b show a technique (1000) for scalable video encoding that includes filtering and upsampling as shown in FIG. 4. FIGS. 11a and 11b show a technique (1100) for scalable video decoding that includes filtering and upsampling as shown in FIG. 4. Alternatively, the technique (400) is used in some other way during scalable video encoding and/or decoding.

B. Example Implementations of Adaptive Filtering and Upsampling

Example implementations use an adaptive filter that combines lowpass filtering and upsampling. This adaptive filtering can reduce artifacts and naturally bring sample depth to a higher level. Subsequent tone mapping can then be conducted within the same sample depth or to a higher sample depth.

Although the adaptive filtering has a flexible design, in general it has two integrated components: lowpass filtering and sample depth upsampling. For example, for a current sample value s(x,y) at location (x,y) in a picture of reconstructed base layer video, the combined filtering and upsampling can be represented as follows.

$$s'(x, y) = \frac{2^{BD-8}}{N} \sum_{i,j \in (-R,R)} w(i, j) \cdot s(x + i, y + j). \quad (1)$$

In this equation, w(i,j) represents a 2D lowpass filter with a normalization factor of N, and R represents the filter range. BD represents the target sample depth, which is greater than or equal to the sample depth of the base layer video, which is shown as 8 in equation (1). Thus, s'(x,y) represents the filtered sample value with sample depth BD.

Figure 5:
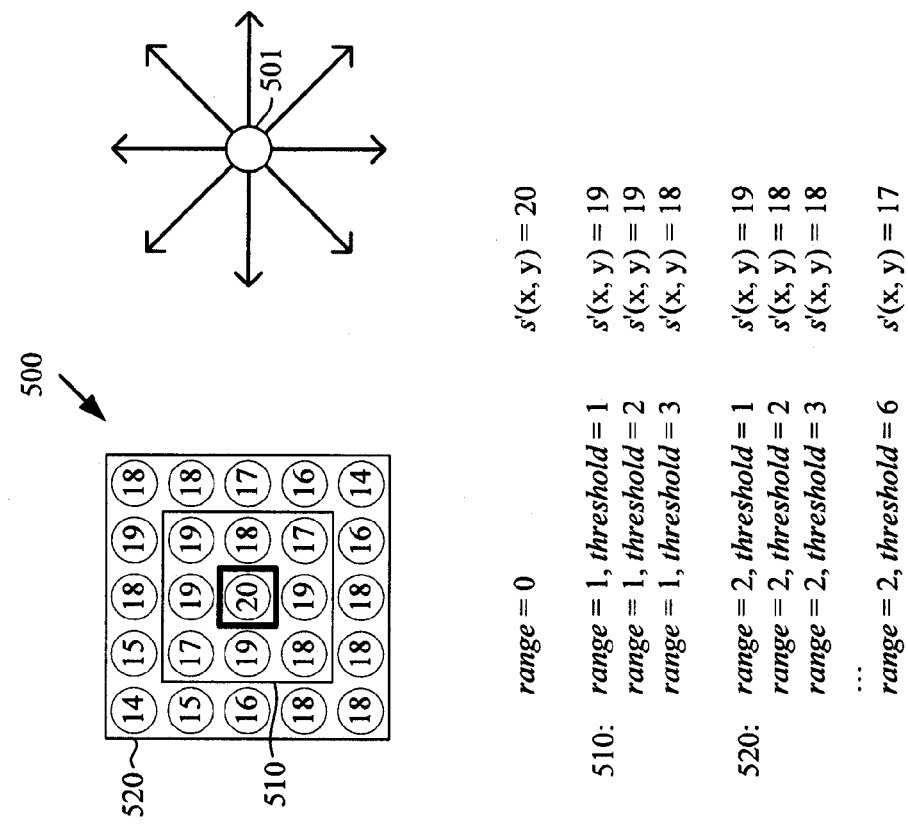
FIG. 5 is a diagram showing example adaptive lowpass filtering options for sample values of base layer video during scalable video encoding or decoding.

The 2D filter can be implemented as a 2D window or as a combination of 1D filters along one or more axes. FIG. 5 shows axes along four directions: horizontal, vertical, top left to bottom right, and bottom left to top right, each including the current sample location (501). Sample values at locations that do not fall on one of these axes are given no weight (w(i,j)=0). Sample values at locations that do fall on one of these axes are given full weight (w(i,j)=1) and count towards the normalization factor. Alternatively, the filter uses another shape, for example, a shape adapted to smooth a different kind of artifact.

The size value R indicates the possible extent of filtering using the filter. In one implementation, R=0, 1 or 2, and sample locations up to +/−2 horizontally and vertically relative to the current location (x,y) are potentially considered. For example sample values (500), FIG. 5 shows a window (510) when R=1 and a window (520) when R=2.

In implementations that adapt to local complexity, within the window, the filter uses a threshold to exclude certain locations. Without loss of generality, the following rule shows how a threshold adaptively changes which sample locations contribute to filtering in a 1D horizontal window. The location offset m represents an extent of similar values within the 1D window, moving away from the current location (x,y). For example, the offset m is set to be the minimum absolute value of i that satisfies the following constraint:

$$|s(x+i,y)-s(x,y)|>T \quad (2),$$

for −R≤i≤R. The threshold value T is a filter threshold control parameter. In FIG. 5, consider the sequence of sample values 16, 19, 20, 18, 17 in a 1D horizontal window, where the current sample value s(x,y)=20. If T=2, the offset value m=1 since at offset +2|17−20|>2. If no value of i satisfies the constraint in equation (2), then m=R. The adaptive filter is symmetric for the sake of simplicity; the same offset m is used in each direction. Alternatively, different offset values are used in different directions away from the current location.

Sample values at locations within the offset m relative to the current location (x,y) are given weight in filtering, and other sample values in the 1D window are not.

$$w(i, j) = \begin{cases} 1 & |i| < m \\ 0 & \text{otherwise,} \end{cases} \quad (3)$$

where j=0 for filtering in the 1D horizontal window, and −R≤i≤R.

Similarly, for the adaptive threshold rule along a 1D vertical window, j varies from −R<j<R when a location offset m is found. For the adaptive threshold rule along a diagonal 1D window, both i and j can vary, where i=j (for one diagonal shown in FIG. 5) or i=−j (for the other diagonal shown in FIG. 5), within the limits of −R and R to find location offset m. For a 2D window, Euclidean distance to locations at different values of i and j, within the limits of −R and R, can be considered to find the location offset m.

Whether or not adaptive threshold rules are applied, when the values of w(i,j) are set, the normalization factor N is determined. In some implementations, the tap coefficients of w(i,j) are either 0 or 1 for the sake of simplicity, and when there is any non-zero w(i,j) value for i≠0 or j≠0, then w(0,0) is set to 0 so that the current sample does not contribute to the filtered result. The normalization factor N is simply the count of locations where w(i,j)=1. More generally, different locations in w(i,j) can have different tap values, for example, to provide more weight at the current location, or to implement a bilinear or bicubic filter, to implement a de-ringing filter or other filter instead of a lowpass filter, or to smooth a different kind of artifact, in which case the tap values for locations contributing to filtering are summed to determine the normalization factor N.

For adaptive implementations of the combined filtering and upsampling represented in equation (1), the strength of the filtering can effectively be controlled by setting the parameter values T and R. FIG. 5 shows the results of filtering the position s(x,y) in the example sample values (500), for different values of R and T. Generally, to reduce the energy of the inter-layer residual video and thereby facilitate compression, the encoding tool adjusts one or more of the strength parameters for filtering. Increasing R increases the possible window size for filtering, which potentially results in stronger filtering. Increasing T tends to cause more locations to contribute to filtering, as more sample values satisfy the similarity constraint, which tends to cause stronger filtering. For example, the threshold strength parameter T is set to 1 and range R is one of {0, 1, 2}. When R=0, there is no lowpass filtering. Alternatively, the strength parameter T and range R have other possible values, or the encoding tool and decoding tool adapt filtering by changing another parameter. For example, the encoder adapts the weighting mechanism and normalization factor.

The encoding tool signals the filter strength control parameters in a bit stream so that a corresponding decoding tool can apply the same filter strength parameters during inverse scaling of the reconstructed base layer video. For example, the enhancement layer bit stream includes the filter strength control parameters.

Depending on implementation, the encoding tool and decoding tool can change filter strength parameters on a per channel per picture basis or some other basis. In some implementations, the encoding tool and decoding tool can selectively disable filtering in some regions (e.g., depending on local image complexity). In some implementations, a scalable video encoding tool and decoding tool use the same filter strength parameters for luma channels and chroma channels of a given picture.

In addition to lowpass filtering and sample depth upsampling, the encoding tool and decoding tool can perform spatial upsampling. If the spatial resolution of the base layer video is lower than the spatial resolution of the inter-layer residual video, the encoding tool or decoding tool can use a spatial interpolation filter (e.g., lowpass filter) to increase the spatial resolution.

V. Adaptive Chroma Upsampling of Reconstructed Base Layer Video

In some embodiments, a scalable video encoding tool and decoding tool perform chroma upsampling on reconstructed base layer video if the chroma sampling rate of the reconstructed base layer video is less than a high fidelity level. By adapting the chroma upsampling to make the reconstructed base layer video more closely approximate input video, the encoding tool can reduce the energy of inter-layer residual video, and thereby improve compression efficiency.

For example, the scalable video encoding tool selects between linear interpolation and cubic interpolation in chroma upsampling for a given chroma channel of a picture of base layer video. The encoding tool selects the type of interpolation that makes the reconstructed base layer video more closely match the input video. The encoding tool signals the selection in a bit stream, and the corresponding decoding tool uses the same type of interpolation for chroma upsampling of the given chroma channel of the picture.

A. Techniques for Adaptive Chroma Upsampling

Figure 6:
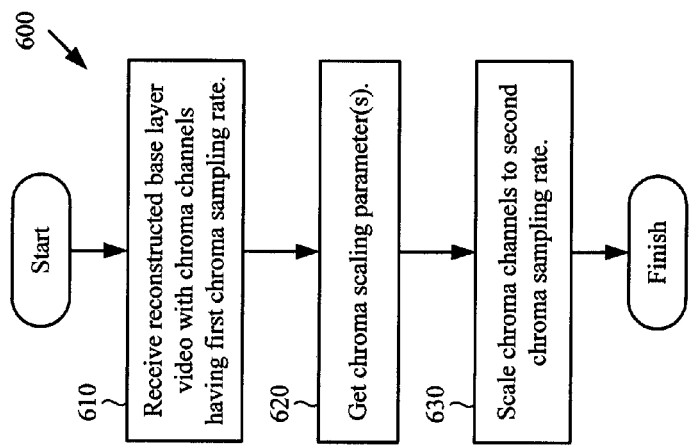
FIG. 6 is a flow chart of a generalized technique for scaling chroma channels of base layer video to a higher chroma sampling rate during scalable video encoding or decoding.

FIG. 6 shows a generalized technique (600) for adaptive chroma upsampling of reconstructed base layer video. A tool such as the scalable video encoding tool (200) of FIG. 2, scalable video decoding tool (300) of FIG. 3, or other tool performs the technique (600).

First, the tool receives (610) reconstructed base layer video with chroma channels having a first chroma sampling rate. For example, the reconstructed base layer video has a chroma sampling rate of 4:2:0 or 4:2:2. Alternatively, the reconstructed base layer video has another chroma sampling rate.

The tool then gets (620) one or more chroma scaling parameters. For example, during encoding, an encoding tool selects the chroma scaling parameter(s) (e.g., after evaluating different values of chroma scaling parameter(s), or after estimating which values of chroma scaling parameter(s) will provide good performance). The encoding tool later signals the chroma scaling parameter(s) as side information in an enhancement layer bit stream or side information signaled out of band. During decoding, a decoding tool receives the chroma scaling parameters from an enhancement layer bit stream (or side channel) and adjusts the chroma upsampling accordingly. Example chroma scaling parameters are presented below. Alternatively, the tool uses other chroma scaling parameters. The chroma scaling parameter(s) can change on a picture-by-picture channel-by-channel basis, or on some other basis.

The tool scales (630) sample values of the chroma channels to a second chroma sampling rate higher than the first chroma sampling rate. For example, the tool scales sample values of chroma channels to convert the chroma sampling rate of reconstructed base layer video from 4:2:0 to 4:2:2, from 4:2:2 to 4:4:4, or from 4:2:0 to 4:4:4. Alternatively, the tool scales sample values of chroma channels to another chroma sampling rate.

The chroma sampling parameter(s) indicate the type of chroma upsampling to use in the scaling (630) operations. For example, the chroma scaling parameter(s) indicate whether the scaling uses linear interpolation with a first predefined filter or cubic interpolation with a second predefined filter. Alternatively, the chroma scaling parameter(s) explicitly indicate filter coefficients of a filter, filter size of a filter and/or another attribute of a filter to use in chroma upsampling, or the chroma scaling parameter(s) indicate a switch between other types of interpolation. Or, the chroma scaling parameter(s) otherwise indicate the type of chroma upsampling in terms of strength of chroma scaling and/or mechanism used in the chroma scaling.

The tool performs the technique (600) on a picture-by-picture basis using a sliding window through a reconstructed base layer video picture, or it performs the technique (600) on some other basis. Although FIG. 6 shows chroma upsampling as being separate from other filtering and upsampling operations, the different filtering and upsampling operations can be performed in combination. Before or after chroma upsampling, the tool can perform inverse tone mapping (not shown in FIG. 6) on the sample values of the reconstructed base layer video, to compensate for tone mapping performed as part of scaling before base layer encoding.

FIGS. 10*a* and 10*b* show a technique (1000) for scalable video encoding that includes chroma upsampling as shown in FIG. 6. FIGS. 11*a* and 11*b* show a technique (1100) for scalable video decoding that includes chroma upsampling as shown in FIG. 6. Alternatively, the technique (600) is used in some other way during scalable video encoding and/or decoding.

B. Example Implementations of Adaptive Chroma Upsampling

Example implementations of chroma upsampling switch between linear interpolation and cubic interpolation. In general, linear interpolation tends to smooth high-frequency patterns in sample values, which can help when high-frequency energy was added to the base layer video and should be removed. In contrast, cubic interpolation tends to preserve or even accentuate high-frequency patterns, which can help when chroma sample values were already smoothed in the base layer video.

The linear interpolation uses the following filters to determine two new chroma sample values $s_{t+1/4}(x,y)$ and $s_{t+3/4}(x,y)$ between two chroma sample values $s_t(x,y)$ and $s_{t+1}(x,y)$ of the reconstructed base layer video.

$$s_{t+1/4}(x,y)=(3\cdot s_t(x,y)+s_{t+1}(x,y))\!>\!>\!2 \quad (4),$$

$$s_{t+3/4}(x,y)=(s_t(x,y)+3\cdot s_{t+1}(x,y))\!>\!>\!2 \quad (5),$$

which correspond to filters with coefficients (3, 1)/4 and (1, 3)/4, respectively. Alternatively, the linear interpolation uses filters with other coefficients.

The cubic interpolation uses the following filters to determine two new chroma sample values $s_{t+1/4}(x,y)$ and $s_{t+3/4}(x,y)$ between two chroma sample values $s_t(x,y)$ and $s_{t+1}(x,y)$ of the reconstructed base layer video.

$$s_{t+1/4}(x,y)=(-3\cdot s_{t-1}(x,y)+28\cdot s_t(x,y)+9\cdot s_{t+1}(x,y)-2\cdot s_{t+2}(x,y))\!>\!>\!5 \quad (6)$$

$$s_{t+3/4}(x,y)=(-2\cdot s_{t-1}(x,y)+9\cdot s_t(x,y)+28\cdot s_{t+1}(x,y)-3\cdot s_{t+2}(x,y))\!>\!>\!5 \quad (7),$$

which correspond to filters with coefficients (−3, 28, 9, −2)/32 and {−2, 9, 28, −3}/32, respectively. Alternatively, the cubic interpolation uses filters with other coefficients. Depending on implementation, the results of cubic interpolation can be clipped so that output values fall within an expected sample depth range.

Figure 7:
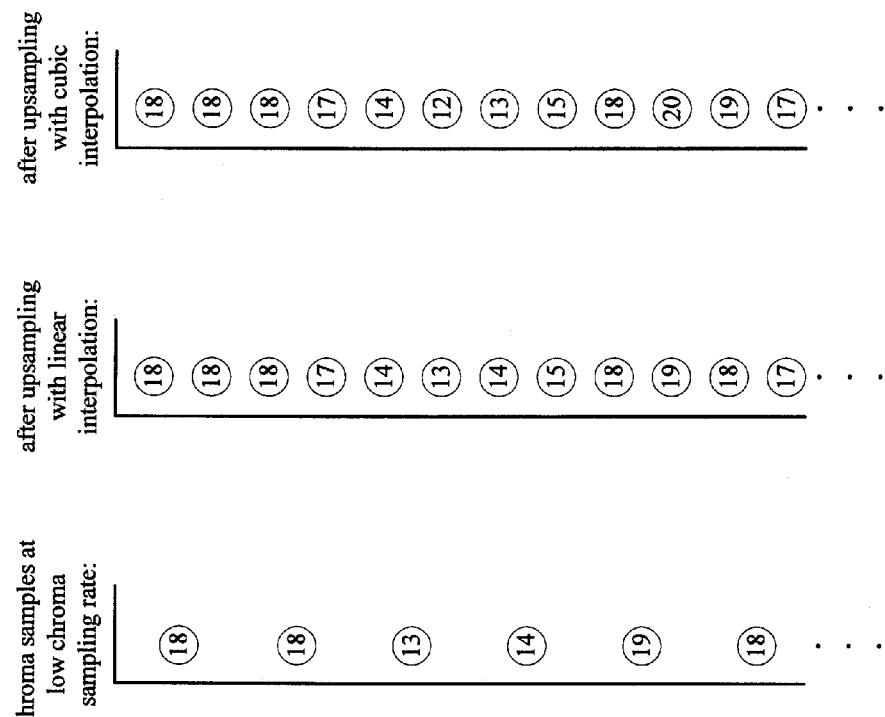
FIG. 7 is a diagram showing example chroma sampling rate scaling options for chroma channels of base layer video during scalable video encoding or decoding.

FIG. 7 shows the results of linear interpolation using the filters of equations (4) and (5) on a set of chroma sample values. FIG. 7 also shows the results of cubic interpolation using the filters of equations (6) and (7) on the chroma sample values. When upsampling from 4:2:0 to 4:2:2, an encoding tool and decoding tool perform vertical interpolation. When upsampling from 4:2:2 to 4:4:4, an encoding tool and decoding tool perform horizontal interpolation. When upsampling from 4:2:0 to 4:4:4, an encoding tool and decoding tool can perform separable vertical and horizontal interpolation or perform 2D filtering. The type of interpolation (e.g., linear or cubic) can be the same or different horizontally and vertically.

The encoding tool and decoding tool select a type of interpolation for chroma upsampling on a per chroma channel per picture basis. Alternatively, the encoding tool and decoding tool switch on some other basis, for example, using the same type of interpolation for both chroma channels of a picture but potentially switching types of interpolation on a picture-by-picture basis. The selection of the type of interpolation for chroma upsampling can be made independently of the type of chroma downsampling used during encoding. After chroma upsampling, the chroma sample values typically differ from original chroma sample values due to compression, different filtering, etc., but the positions of the chroma sample values should be the same in the reconstructed base layer video and input video.

After determining which type of chroma upsampling to use, the encoding tool signals chroma sampling parameter(s) indicating the selection in the enhancement layer bit stream or another bit stream. The decoding tool parses the chroma sampling parameter(s) from the bit stream and uses them to select which type of chroma upsampling to perform.

The encoding tool and decoding tool can perform the chroma upsampling in combination with adaptive lowpass filtering, sample depth upsampling and/or inverse tone mapping. Or, they can perform the chroma upsampling separately. For example, the encoding tool and decoding tool can separately perform chroma upsampling after lowpass filtering and sample depth upsampling, but before inverse tone mapping. Or, the encoding tool and decoding tool separately perform chroma upsampling after lowpass filtering, sample depth upsampling and inverse tone mapping, so as to reduce the number of mapping operations in the chroma channels.

VI. Adaptive Remapping of Inter-Layer Residual Video

In some embodiments, a scalable video encoding tool and decoding tool perform sample value mapping on sample values of inter-layer residual video. With remapping, an encoding tool scales inter-layer residual video values by an appropriate factor selected by the encoding tool. The encoding tool signals the scaling factor to a corresponding decoding tool. Using remapping, the decoding tool inverse scales the inter-layer residual video values according to the scaling factor, then combines the inverse scaled inter-layer residual video with reconstructed base layer video. The scaling and inverse scaling allow inter-layer residual video of many different dynamic ranges to be coded efficiently with a given enhancement layer codec.

For example, typical enhancement layer video encoders work most effectively with 8-bit values having a dynamic range of 256 (+/−128 around a mid-point of 128, for a range of 0 . . . 255). If the dynamic range of the inter-layer residual video is much larger than 256, or skewed relative to the mid-point 128, or much smaller than 256, compression efficiency of the enhancement layer encoder may suffer. Thus, an encoding tool maps sample values of inter-layer residual video into a target dynamic range of 256 (+/−128 around a mid-point of 128) for encoding; after decoding, a decoding tool maps sample values of the inter-layer residual video back to the initial dynamic range.

Remapping sample values of inter-layer residual video is useful in many encoding and decoding scenarios. For example, due to tone mapping, differences between input video and reconstructed base layer video can exceed the dynamic range of the enhancement layer encoder. For example, if 10-bit input video (with a wide color gamut) is tone-mapped to 8-bit video (with a more limited color gamut) for base layer encoding, differences between the 10-bit input video and 10-bit reconstructed base layer video (after inverse tone mapping) often exceed the dynamic range that can be effectively encoded with 8-bit samples. In other scenarios, due to low quality/low bit rate encoding of base layer video, the differences between input video and reconstructed base layer video result in a large dynamic range for inter-layer residual video, which the enhancement layer encoder may not be able to encode efficiently.

In still other scenarios, the differences between input video and reconstructed base layer video are much smaller than the dynamic range of the enhancement layer encoder. Because the enhancement layer encoder is not adapted to encode content with such a small dynamic range, quality can suffer even if the inter-layer residual video is encoded with the highest quality allowed. For example, an enhancement layer encoder adapted to encode sample values with a dynamic range of 256 may have difficulty encoding inter-layer residual video having only sample values less than 151, or a dynamic range of 9.

A. Techniques for Remapping Inter-Layer Residual Video

Figure 8:
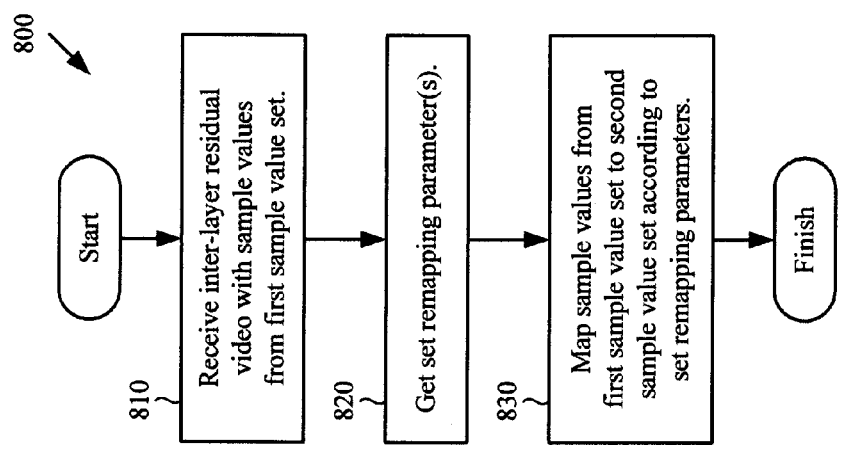
FIG. 8 is a flow chart of a generalized technique for remapping sample values of inter-layer residual video during scalable video encoding or decoding.

FIG. 8 shows a generalized technique (800) for remapping sample values of inter-layer residual video. A tool such as the scalable video encoding tool (200) of FIG. 2, scalable video decoding tool (300) of FIG. 3, or other tool performs the technique (800).

To start, the tool receives (810) inter-layer residual video that has sample values from a first sample value set. For remapping operations in scalable video encoding, the first sample value set is the initial set of sample values of the inter-layer residual video. For example, the inter-layer residual video initially has 10-bit sample values from an initial sample value set with a range of −277 . . . 301, or −4 . . . 3, or −491 . . . 563. For inverse remapping operations in scalable video decoding, the first sample value set is the target sample value set that resulted from remapping by the encoding tool during scalable video encoding.

The tool then gets (820) one or more set remapping parameters. For example, during scalable video encoding an encoding tool selects the set remapping parameter(s) (e.g., after evaluating different values of set remapping parameter(s), or after estimating which values of set remapping parameter(s) will provide good performance). The encoding tool later signals the set remapping parameter(s) as side information in an enhancement layer bit stream or side information signaled out of band. During scalable video decoding, a decoding tool receives the set remapping parameters from an enhancement layer bit stream (or side channel) and adjusts the inverse remapping accordingly. Example set remapping parameters are presented below. Alternatively, the tool uses other set remapping parameters. The set remapping parameter(s) can change on a picture-by-picture channel-by-channel basis, or on some other basis.

The tool maps (830) sample values from the first sample value set to a second sample value set. For example, for remapping in scalable video encoding, an encoding tool maps sample values from an initial sample value set to a target sample value set used in enhancement layer coding/decoding. Or, for inverse remapping in scalable video decoding, a decoding tool maps sample values from the target sample value set used in enhancement layer coding/decoding back to the initial sample value set.

The tool performs the technique (800) on a picture-by-picture basis for an inter-layer residual video picture, or it performs the technique (800) on some other basis. Although FIG. 8 shows sample value remapping as being separate from other operations, other operations can be performed in combination with the sample value remapping.

FIGS. 10a and 10b show a technique (1000) for scalable video encoding that includes sample value remapping as shown in FIG. 8. FIGS. 11a and 11b show a technique (1100) for scalable video decoding that includes sample value remapping as shown in FIG. 8. Alternatively, the technique (800) is used in some other way during scalable video encoding and/or decoding.

B. Example Implementations of Remapping of Inter-Layer Residual Video

Example implementations of sample value remapping for inter-layer residual video adjust the dynamic range of inter-layer residual video before enhancement layer encoding, then invert the adjustment after enhancement layer decoding. In many encoding scenarios, adjusting the dynamic range of the inter-layer residual video improves the efficiency of the enhancement layer encoding.

In example implementations, an encoding tool determines whether to perform sample value remapping for sample values of a picture of inter-layer residual video. The encoding tool makes this determination independently for the respective luma and chroma channels of the picture. For the picture, the encoding tool signals an on/off flag in the enhancement layer bit stream that indicates whether sample value remapping is used for at least one channel.

When sample value remapping is used for the sample values of a channel, the encoding tool determines what parameters to use for the sample value remapping. Generally, the encoding tool selects parameters so that the dynamic range of the inter-layer residual video fits the dynamic range of the enhancement layer codec. For example, if the dynamic range of the enhancement layer codec is 256 (+/−128 around a mid-point of 128) and the initial dynamic range of the inter-layer residual video is 380 (−190 . . . 189 around a mid-point of 0), the encoding tool selects remapping parameters that scale 380 down to the target of 256 and shift the range of the sample values so that it has the mid-point of the target range.

Figure 9:
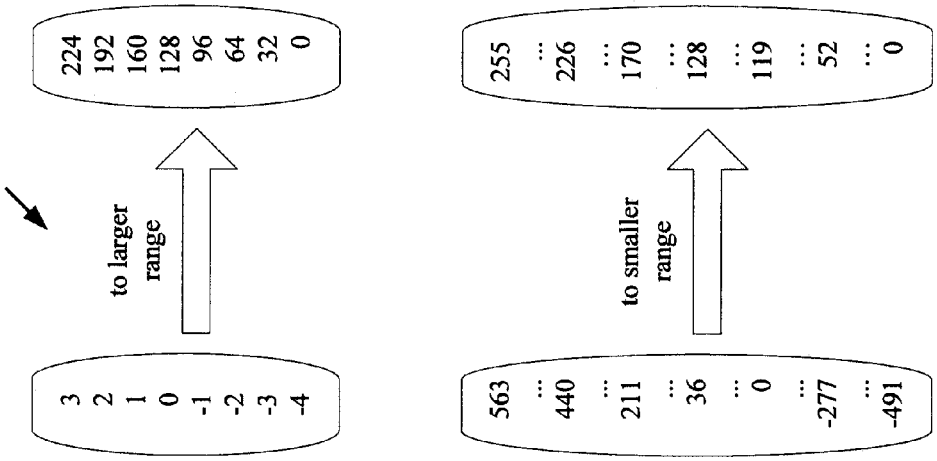
FIG. 9 is a diagram showing example remapping of sample values of inter-layer residual video during scalable video encoding.

FIG. 9 shows two examples of sample value remapping before encoding of inter-layer residual video. In the first example, the dynamic range of the sample values is 8 (range −4 . . . 3), which is too small to be encoded efficiently. The encoding tool maps the sample values to a larger range of 0 . . . 224. The center of the range is also shifted in the remapping. In the second example, the dynamic range of the sample values is 1054 (range −491 . . . 563 with midpoint of 36). The encoding tool maps the sample values to a smaller range of 0 . . . 255. In the remapping, the encoding changes the center of the range to 128.

When determining set remapping parameters, the encoding tool evaluates the sample values of the inter-layer residual video. For example, the encoding tool finds the highest value and the lowest value, then determines the dynamic range of the inter-layer residual video. The ratio between the target dynamic range and the initial dynamic range of the inter-layer residual video generally indicates possible scaling for the remapping, but the encoding tool can choose more aggressive scaling that still results in sample values within the target dynamic range. The encoding tool can apply ceiling and floor functions to the sample values of the inter-layer residual video, so as to screen outliers that would otherwise mislead the encoding tool about the distribution of sample values. For example, with respect to the second example of FIG. 9, if 99 percent of the values are between −300 and 450, the encoding tool clips outlier values of −491, 563, etc. so that the dynamic range is 750 not 1054, and scaling is less aggressive.

Parameterization and scaling operations in encoder-side range remapping depend on implementation. In general, for a given decoder-side range remapping scheme, an encoding tool is free to use any of several different range remapping schemes that are consistent with that decoding scheme. Example implementations use three parameters Scale, Shift and Norm that indicate how to perform sample value remapping. The encoding tool can use different Scale, Shift and Norm parameters for each channel of a picture of inter-layer residual video. For a given initial sample value $s(x,y)$ of a channel the encoding tool computes a remapped sample value $s_r(x,y)$ as follows.

$$s_r(x, y) = nint\left(\frac{s(x, y) << \text{Norm}}{\text{Scale}} + \text{Shift}\right), \quad (8)$$

where the ratio of $$\frac{2^{norm}}{scale}$$

generally indicates dynamic range scaling, Shift indicates a shift in center of range, and the operator nint(x) returns the nearest integer value to a floating point value x. The remapping operation can also include rounding offsets (not shown). For the first example of FIG. 9, the values of the parameters are Scale=1, Shift=128 and Norm=5. For the second example, the values of the parameters are Scale=33, Shift=119 and Norm=3.

At picture level in the enhancement layer bit stream, the encoding tool signals a one-bit syntax element RES_SCALING_PRESENT. If RES_SCALING_PRESENT is zero, residual remapping parameters are not present in the bit stream and the default values are Scale=1, Shift=128 and Norm=0. Generally, applying these default values in remapping changes sample values from an initial set of −128 . . . 127 to a target set of 0 . . . 255, and changes sample values back to the initial set in inverse remapping.

If RES_SCALING_PRESENT is one, residual remapping parameters are present in the bit stream. The bit stream includes the parameters shown in the following table.

TABLE 1

Example Set Remapping Parameters

| Parameter | Bits | Semantic |
|---|---|---|
| SCALE_Y | 8 | Scale parameter for Y channel of picture, with 1 <= Scale <= 256. |
| SHIFT_Y | 8 | Shift parameter for Y channel of picture, with 0 <= Shift <= 255. |
| NORM_Y | 3 | Norm parameter for Y channel of picture, with 0 <= Norm <= 7. |
| SCALE_U | 8 | Scale parameter for U channel of picture, with 1 <= Scale <= 256. |
| SHIFT_U | 8 | Shift parameter for U channel of picture, with 0 <= Shift <= 255. |
| NORM_U | 3 | Norm parameter for U channel of picture, with 0 <= Norm <= 7. |
| SCALE_V | 8 | Scale parameter for V channel of picture, with 1 <= Scale <= 256. |
| SHIFT_V | 8 | Shift parameter for V channel of picture, with 0 <= Shift <= 255. |
| NORM_V | 3 | Norm parameter for V channel of picture, with 0 <= Norm <= 7. |

At the decoder side, for a picture of inter-layer residual video, a decoding tool receives a one-bit on/off flag and, for each channel of the picture, potentially receives Scale, Shift and Norm parameters signaled by the encoding tool. To reconstruct a sample value $s'(x,y)$ of a channel from the remapped sample value $s_r(x,y)$, the decoding tool performs inverse scaling as follows.

$$s'(x,y) = ((s_r(x,y) - \text{Shift}) * \text{Scale}) >> \text{Norm} \quad (9).$$

Low complexity is particularly valuable at the decoder-side, where division-free operations are used according to equation (9).

In some implementations, the sample values of skipped macroblocks or skipped channels in inter-layer residual video are meant to be zero. If the enhancement layer decoder simply sets the sample values to zero, inverse remapping may change the sample values to have non-zero values. Thus, the enhancement layer decoder sets the sample values $s_r(x,y)$ of skipped macroblocks or skipped channels to Shift, so that they are zero after inverse remapping:

$$s'(x,y) = ((\text{Shift} - \text{Shift}) * \text{Scale}) >> \text{Norm} = 0.$$

In some implementations, the enhancement layer encoder and decoder perform motion compensation on inter-layer residual video. If one or more of the channels of a current picture have different set remapping parameters than corresponding channels of a reconstructed picture, the enhancement layer encoder and decoder can adjust the affect channel(s) of the reconstructed picture. For example, the encoding tool and decoding tool inverse map sample values of the affected channel(s) of the reconstructed picture to their original dynamic range(s) using the set remapping parameters of the affected channel(s) of the reconstructed picture, then remap the sample values of the affected channel(s) using the set remapping parameters of the appropriate channel(s) in the current picture. If the second remapping results in sample values outside the target dynamic range, the sample values are clipped. The enhancement layer encoder and decoder then perform motion compensation for blocks, macroblocks, etc. in the current picture relative to the reconstructed picture.

The preceding examples use parameters for Shift, Scale and Norm with certain ranges of values. Alternatively, the encoding tool and decoding tool use parameters with different ranges of values (e.g., larger ranges) or use parameters that allow for a different level of precision in scaling and inverse scaling. Or, the encoding tool and decoding tool use other parameters for sample value remapping. The remapping operations in equations (8) and (9) use linear scaling. Alternatively, remapping operations are implemented according to other linear mapping rules, or remapping operations are implemented by look-up table(s) or other non-linear rules.

In the preceding examples, range remapping uses different scaling factors for luma and chroma channels of inter-layer residual video. Alternatively, range remapping uses the same scaling factors for luma and chroma channels of inter-layer residual video. Similarly, instead of signaling remapping on/off flags on a picture-by-picture base, the encoding tool can signal on/off flags on a channel-by-channel basis, slice-by-slice basis, or some other basis.

VII. Combined Implementations

FIGS. 10a and 10b show an example technique (1000) for scalable video encoding using adaptive lowpass filtering, sample depth upsampling, chroma upsampling and residual value remapping. An encoding tool such as the encoding tool (200) shown in FIG. 2 or other encoding tool performs the technique (1000). Generally, in FIGS. 10a and 10b, operations performed with a base layer encoder or an enhancement layer encoder are grouped away from other operations performed as part of the scalable video encoding.

To start, the encoding tool scales (1010) input video to produce base layer video. The base layer encoder encodes (1020) the base layer video, producing encoded data that the base layer encoder signals in a base layer bitstream. The base layer encoder also reconstructs (1022) the base layer video.

The encoding tool selects (1030) one of more filter strength parameters for an adaptive lowpass filter, filters (1032) the reconstructed base layer video using the adaptive lowpass filter, and upsamples (1034) sample values of the reconstructed base layer video to a higher sample depth. For example, to evaluate different value(s) for filter strength parameter(s), the encoding tool filters the reconstructed base layer video with a lowpass filter adjusted according to given value(s) and performs sample depth upsampling, then checks results of the filtering/upsampling. After the encoding tool finds acceptable value(s), the encoding tool signals (1036) the filter strength parameter(s) in an enhancement layer bit stream. The encoding tool can also perform inverse tone mapping on the upsampled values of the reconstructed base layer video.

The encoding tool also selects (1040) one or more chroma scaling parameters for adaptive chroma upsampling and scales (1042) chroma channels to a higher chroma sampling rate. For example, to evaluate different value(s) for the chroma scaling parameter(s), the encoding tool performs chroma upsampling as indicated by the value(s) then checks the results. After the encoding tool find acceptable value(s), the encoding tool signals (1044) the chroma scaling parameter(s) in the enhancement layer bit stream.

The encoding tool determines (1050) inter-layer residual video as the sample-by-sample differences between reconstructed base layer video and the input video then remaps sample values of the inter-layer residual video. The encoding tool selects (1060) one or more set remapping parameters and maps (1062) sample values of the inter-layer residual video from one sample value set to another sample value set according to the set remapping parameters. For example, to evaluate different value(s) for the set remapping parameter(s), the encoding tool performs mapping as indicated by the value(s) then checks the results. After the encoding tool find acceptable value(s), the encoding tool signals (1064) the set remapping parameter(s) in the enhancement layer bit stream.

Finally, the enhancement layer encoder encodes (1070) the inter-layer residual video, producing encoded data that is signaled in the enhancement layer bit stream. The encoding tool repeats the adaptive encoding (1000) on a picture-by-picture basis.

FIGS. 11a and 11B show an example technique (1100) for scalable video decoding using adaptive lowpass filtering, sample depth upsampling, chroma upsampling and residual value remapping. A decoding tool such as the decoding tool (300) shown in FIG. 3 or other decoding tool performs the technique (1100). Generally, in FIGS. 11a and 11b, operations performed with a base layer decoder or an enhancement layer decoder are grouped away from other operations performed as part of the scalable video decoding.

The base layer decoder receives (1110) encoded data for base layer video in a base layer bit stream and decodes (1112) the base layer video. The decoding tool parses (1130) one or more filter strength parameters from an enhancement layer bitstream and adjusts an adaptive lowpass filter using the filter strength parameter(s). The decoding tool filters (1132) the reconstructed base layer video using the adaptive lowpass filter and upsamples (1134) sample values of the base layer video to a higher sample depth. The encoding tool and decoding tool perform the same filtering (1032, 1132) and upsampling (1034, 1134) operations on reconstructed base layer video. The decoding tool can also perform inverse tone mapping on the upsampled values of the reconstructed base layer video.

The decoding tool parses (1140) one or more chroma scaling parameters from the enhancement layer bit stream. The decoding tool scales (1142) chroma channels of the reconstructed base layer video to a higher chroma sampling rate, using a type of chroma upsampling indicated by the chroma scaling parameter(s). The encoding tool and decoding tool perform the same chroma upsampling (1042, 1142) operations on reconstructed base layer video.

Separately, an enhancement layer decoder receives (1150) encoded data for inter-layer residual video in the enhancement layer bit stream and decodes (1152) the inter-layer residual video. The decoding tool parses (1160) one or more set remapping parameters from the enhancement layer bit stream, then maps (1162) sample values of the inter-layer residual video from one sample value set to another sample value set according to the set remapping parameter(s). The decoding tool performs remapping (1162) operations that are the inverse of the remapping operations (1062) performed by the encoding tool.

Finally, the decoding tool combines (1170) the remapped inter-layer residual video with the filtered/upsampled base layer video, producing a reconstructed version of the input video. The decoding tool repeats the adaptive decoding (1100) on a picture-by-picture basis.

VIII. Alternatives

Many of the examples described herein involve adaptive behavior (e.g., for filtering, chroma upsampling or sample value remapping) that is indicated by parameters signaled as side information. Alternatively, an encoding tool and decoding tool adapt filtering, chroma upsampling and/or sample value remapping based on contextual information available to the encoding tool and the decoding tool, without express signaling of parameters as side information.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of using a scalable video processing tool with bit depth scalability, the method comprising:
   receiving base layer video after reconstruction of the base layer video, wherein the reconstructed base layer video has plural sample values with a first sample depth having a first number of bits per sample value;
   adjusting an adaptive lowpass filter based upon one or more filter strength parameters that are signaled as side information in an enhancement layer bit stream; and
   filtering the reconstructed base layer video using the adaptive lowpass filter in combination with upsampling the plural sample values of the reconstructed base layer video to a second sample depth having a second number of bits per sample value, the second number of bits per sample value being higher than the first number of bits per sample value associated with the first sample depth, wherein the filtering includes changing normalization factor of the adaptive lowpass filter at a location depending on how many neighbor sample values around the location are within a threshold of similarity to a current sample value at the location.

2. The method of claim 1 wherein the reconstructed base layer video includes a picture, and wherein the adaptive lowpass filter is adapted to remove artifacts or dithering.

3. The method of claim 1 further comprising inverse tone mapping the plural sample values of the reconstructed base layer video after the upsampling.

4. The method of claim 1 wherein the one or more filter strength parameters include a kernel size of the adaptive lowpass filter and the threshold of similarity.

5. The method of claim 1 wherein the reconstructed base layer video includes a picture having a first spatial resolution, and wherein the method further comprises upsampling the picture to a second spatial resolution different than the first spatial resolution.

6. The method of claim 1 wherein the method further comprises, during encoding:
   scaling input video to produce the base layer video;
   encoding the base layer video with a base layer video encoder to produce at least part of a base layer bit stream and reconstructing the base layer video;
   determining inter-layer residual video from the input video and the reconstructed base layer video after the filtering and the upsampling;
   encoding the inter-layer residual video with an enhancement layer video encoder to produce at least part of the enhancement layer bit stream; and
   outputting the at least part of the base layer bitstream and the at least part of the enhancement layer bit stream.

7. The method of claim 1 wherein the method further comprises, during decoding:
   receiving at least part of a base layer bitstream and at least part of the enhancement layer bitstream;
   using the at least part of the base layer bitstream, decoding the base layer video with a base layer video decoder to produce the reconstructed base layer video;
   using the at least part of the enhancement layer bitstream, decoding inter-layer residual video with an enhancement layer video decoder to reconstruct the inter-layer residual video; and
   combining the reconstructed inter-layer residual video and the reconstructed base layer video after the filtering and the upsampling.

8. A computing device that implements a scalable video processing tool, wherein the computing device includes memory and a processor programmed to perform operations comprising:
   receiving base layer video after reconstruction of the base layer video, wherein the reconstructed base layer video has plural sample values with a first sample depth;
   filtering the reconstructed base layer video using an adaptive lowpass filter, wherein the filtering includes changing normalization factor of the adaptive lowpass filter at a location depending on how many neighbor sample values around the location are within a threshold of similarity to a current sample value at the location; and
   upsampling the plural sample values of the reconstructed base layer video to a second sample depth higher than the first sample depth.

9. The computing device of claim 8 wherein the operations further comprise inverse tone mapping the plural sample values of the reconstructed base layer video after the upsampling.

10. The computing device of claim 8 wherein the operations further comprise, before the filtering, adjusting the adaptive lowpass filter based upon one or more filter strength parameters that are signaled as side information.

11. The computing device of claim 10 wherein the one or more filter strength parameters include a kernel size of the adaptive lowpass filter and the threshold of similarity for comparisons of the current sample value to the neighbor sample values.

12. The computing device of claim 8 wherein the reconstructed base layer video includes a picture having a first spatial resolution, and wherein the operations further comprise upsampling the picture to a second spatial resolution different than the first spatial resolution.

13. The computing device of claim 8 wherein the operations further comprise, during encoding:
   scaling input video to produce the base layer video;
   encoding the base layer video with a base layer video encoder to produce at least part of a base layer bit stream and reconstructing the base layer video;
   determining inter-layer residual video from the input video and the reconstructed base layer video after the filtering and the upsampling;
   encoding the inter-layer residual video with an enhancement layer video encoder to produce at least part of an enhancement layer bit stream; and
   outputting the at least part of the base layer bitstream and the at least part of the enhancement layer bit stream.

14. The computing device of claim 8 wherein the operations further comprise, during decoding:
   receiving at least part of a base layer bitstream and at least part of an enhancement layer bitstream;
   using the at least part of the base layer bitstream, decoding the base layer video with a base layer video decoder to produce the reconstructed base layer video;

using the at least part of the enhancement layer bitstream, decoding inter-layer residual video with an enhancement layer video decoder to reconstruct the inter-layer residual video; and combining the reconstructed inter-layer residual video and the reconstructed base layer video after the filtering and the upsampling.

15. A computer-readable storage device or memory having stored thereon computer-executable instructions for causing a computer system when programmed thereby to perform:

receiving base layer video after reconstruction of the base layer video, wherein the reconstructed base layer video has plural sample values with a first sample depth having a first number of bits per sample value;

adjusting an adaptive lowpass filter based upon one or more filter strength parameters that are signaled as side information, wherein the one or more filter strength parameters include a kernel size of the adaptive lowpass filter and a threshold of similarity for comparisons of a current sample value to neighbor sample values;

filtering the reconstructed base layer video using the adaptive lowpass filter; and upsampling the plural sample values of the reconstructed base layer video to a second sample depth having a second number of bits per sample value, the second number of bits per sample value being higher than the first number of bits per sample value associated with the first sample depth.

16. The computer-readable storage device or memory of claim 15 further having stored thereon computer-executable instructions for causing the computer system when programmed thereby to perform inverse tone mapping the plural sample values of the reconstructed base layer video after the upsampling.

17. The computer-readable storage device or memory of claim 15 wherein the reconstructed base layer video includes a picture having a first spatial resolution, the computer-readable storage device or memory further having stored thereon computer-executable instructions for causing the computer system when programmed thereby to perform upsampling the picture to a second spatial resolution different than the first spatial resolution.

18. The computer-readable storage device or memory of claim 15 wherein the adaptive lowpass filter is adapted to remove artifacts or dithering.

19. The computer-readable storage device or memory of claim 15 wherein the adjusting includes changing normalization factor of the adaptive lowpass filter depending on how many of the neighbor sample values are within the threshold of similarity to the current sample value.

20. A method of using a scalable video processing tool with bit depth scalability, the method comprising:

receiving base layer video after reconstruction of the base layer video, wherein the reconstructed base layer video has plural sample values with a first sample depth having a first number of bits per sample value;

adjusting an adaptive lowpass filter based upon one or more filter strength parameters that are signaled as side information in an enhancement layer bit stream, wherein the one or more filter strength parameters include a kernel size of the adaptive lowpass filter and a threshold of similarity for comparisons of a current sample value to neighbor sample values; and filtering the reconstructed base layer video using the adaptive lowpass filter in combination with upsampling the plural sample values of the reconstructed base layer video to a second sample depth having a second number of bits per sample value, the second number of bits per sample value being higher than the first number of bits per sample value associated with the first sample depth.

* * * * *